US012771131B2

(12) United States Patent
Pankova et al.

(10) Patent No.: US 12,771,131 B2
(45) Date of Patent: Oct. 20, 2026

(54) ELECTRICAL GRID ANOMALY DETECTION, CLASSIFICATION, AND PREDICTION

(71) Applicant: Utilidata, Inc., Providence, RI (US)

(72) Inventors: Daria Pankova, State College, PA (US); Zebediah Engberg, Mt. Pleasant, UT (US); Taylor Spalt, Richmond, VA (US); Marissa Hummon, Golden, CO (US)

(73) Assignee: Utilidata, Inc.

( * ) Notice: Subject to any disclaimer, the term of this patent is extended or adjusted under 35 U.S.C. 154(b) by 495 days.

(21) Appl. No.: 18/207,479

(22) Filed: Jun. 8, 2023

(65) Prior Publication Data

US 2024/0178667 A1 May 30, 2024

Related U.S. Application Data

(60) Provisional application No. 63/453,234, filed on Mar. 20, 2023, provisional application No. 63/428,473, filed on Nov. 29, 2022.

(51) Int. Cl.
*H02J 3/0012* (2026.01)
*H02J 103/30* (2026.01)
*H02J 103/35* (2026.01)

(52) U.S. Cl.
CPC ......... *H02J 3/0012* (2020.01); *H02J 2103/30* (2026.01); *H02J 2103/35* (2026.01)

(58) Field of Classification Search
CPC .. H02J 3/0012; H02J 2203/10; H02J 2203/20; H02J 13/00002
See application file for complete search history.

(56) References Cited

U.S. PATENT DOCUMENTS 5,982,181 A 11/1999 Rokunohe et al.
8,140,283 B2 3/2012 Benmouyal et al.
(Continued)

FOREIGN PATENT DOCUMENTS

CN 110901446 A 3/2020
CN 113538037 A 10/2021
(Continued)

OTHER PUBLICATIONS

"MicroPMU&LV" downloaded from the internet https://powerside.com/products/monitoring/micropmu/ Jan. 31, 2023.
(Continued)

*Primary Examiner* — Christopher E. Everett
(74) *Attorney, Agent, or Firm* — Foley & Lardner LLP

(57) ABSTRACT

Anomaly detection, classification, and prediction is provided. A system can include one or more processors coupled with memory. The system can identify voltage waveform data corresponding to electricity distributed over a utility grid and measured by a metering device. The system can detect, based on a comparison with baseline voltage waveform data, an anomaly in at least a portion of the voltage waveform data. The system can generate spectrogram data for the at least the portion of the voltage waveform data comprising the anomaly. The system can determine, via a model trained with machine learning, a type of the anomaly based on the spectrogram data. The system can provide an indication of the type of the anomaly to cause an action to be performed on the utility grid responsive to determination of the type of anomaly.

20 Claims, 7 Drawing Sheets

(56) References Cited

U.S. PATENT DOCUMENTS

| | | | |
|---|---|---|---|
| 8,437,883 B2 | 5/2013 | Powell et al. | |
| 8,577,510 B2 | 11/2013 | Powell et al. | |
| 9,625,889 B2 | 4/2017 | Gupta et al. | |
| 9,889,759 B1 | 2/2018 | Aswani et al. | |
| 10,114,347 B2 | 10/2018 | Gupta et al. | |
| 10,132,853 B2* | 11/2018 | Liang | G01R 31/086 |
| 10,191,096 B2 | 1/2019 | Cheng et al. | |
| 10,460,274 B2 | 10/2019 | He et al. | |
| 10,630,502 B2 | 4/2020 | Shyr et al. | |
| 10,657,110 B2 | 5/2020 | Gupta et al. | |
| 11,322,976 B1 | 5/2022 | Anderson et al. | |
| 11,435,772 B2 | 9/2022 | Gupta et al. | |
| 11,515,725 B2 | 11/2022 | Toulgoat-Dubois et al. | |
| 11,533,193 B2 | 12/2022 | Shyr et al. | |
| 2010/0082792 A1 | 4/2010 | Johnson | |
| 2011/0043952 A1 | 2/2011 | Haussel et al. | |
| 2011/0156698 A1 | 6/2011 | Cook | |
| 2013/0289788 A1 | 10/2013 | Gupta et al. | |
| 2014/0265574 A1 | 9/2014 | Tyler et al. | |
| 2014/0277796 A1 | 9/2014 | Peskin et al. | |
| 2014/0277813 A1 | 9/2014 | Powell et al. | |
| 2014/0277814 A1 | 9/2014 | Hall et al. | |
| 2014/0312693 A2 | 10/2014 | Powell et al. | |
| 2015/0241482 A1 | 8/2015 | Sonderegger | |
| 2016/0055419 A1 | 2/2016 | Fischer et al. | |
| 2017/0307676 A1* | 10/2017 | Gaouda | G01R 31/62 |
| 2018/0299877 A1* | 10/2018 | Cheng | G05B 23/0278 |
| 2020/0011903 A1* | 1/2020 | Menzel | G01R 19/003 |
| 2020/0122598 A1 | 4/2020 | Lu et al. | |
| 2020/0212676 A1* | 7/2020 | Dehghanian | G01R 19/2513 |
| 2020/0293033 A1* | 9/2020 | He | G01R 19/2513 |
| 2020/0356668 A1* | 11/2020 | Hart | G06F 21/554 |
| 2021/0088563 A1 | 3/2021 | Yan et al. | |
| 2021/0110313 A1 | 4/2021 | Jones | |
| 2021/0165032 A1 | 6/2021 | Naido et al. | |
| 2022/0018886 A1 | 1/2022 | Mascherin | |
| 2022/0147035 A1 | 5/2022 | Rodemann et al. | |
| 2022/0414484 A1 | 12/2022 | Garza | |
| 2022/0416541 A1 | 12/2022 | Abaas | |
| 2024/0054322 A1 | 2/2024 | Lin et al. | |
| 2024/0149736 A1 | 5/2024 | Decker | |

FOREIGN PATENT DOCUMENTS

| | | |
|---|---|---|
| CN | 114915560 A | 8/2022 |
| EP | 3 618 214 A1 | 3/2020 |
| KR | 20140013465 A | 2/2014 |
| WO | WO-2022/060808 A1 | 3/2022 |

OTHER PUBLICATIONS

"Power Metering and Energy Monitoring Systems", downloaded from internet https://www.se.com/us/en/product-category/4100-power-metering-and-energy-monitoring-systems/ Jan. 31, 2023.

A. Sundaram, "Distribution Fault Anticipator", Electric Power Research Institute, Nov. 25, 2005, pp. 1-76.

Berrisford, A. J. (May 2013), "A tale of two transformers: An algorithm for estimating distribution secondary electric parameters using smart meter data"; in 2013 26th IEEE Canadian Conference on Electrical and Computer Engineering (CCECE) (pp. 1-6), IEEE.

Blakely, L., & Reno, M. J. (Aug. 2020), "Identifying Errors in Service Transformer Connections"; in 2020 IEEE Power & Energy Society General Meeting (PESGM) (pp. 1-5), IEEE.

Bolognani, S., Bof, N., Michelotti, D., Muraro, R., & Schenato, L. (Dec. 2013), "Identification of power distribution network topology via voltage correlation analysis"; in 52nd IEEE Conference on Decision and Control (pp. 1659-1664), IEEE.

Cavraro, G., Arghandeh, R., Poolla, K., & Von Meier, A. (Jul. 2015), "Data-driven approach for distribution network topology detection"; in 2015 IEEE power & energy society general meeting (pp. 1-5), IEEE.

Dey et al., "Solar farm voltage anomaly detection using high-resolution μPMU data-driven unsupervised machine learning", Applied Energy, vol. 303, Aug. 26, 2021, pp. 1-11.

El Chamie et al., "Physics-Based Features for Anomaly Detection in Power Grids with Micro-PMUs", 2018 IEEE International Conference on Communications (ICC), Kansas City, MO, USA, 2018, pp. 1-7.

Ghaderi et al., "High impedance fault detection: A Review", Electric Power Systems Research, Oct. 10, 2016, pp. 1-16.

Matthews et al., "Leveraging MapReduce and Synchrophasors for Real-Time Anomaly Detection in the Smart Grid", IEEE Transactions on Emerging Topics in Computing, Sep. 4, 2019, pp. 392-403.

Matthews et al., "Leveraging Single Board Computers for Anomaly Detection in the Smart Grid", downloaded from internet https://www.suzannejmatthews.com/docs/Matthews2017c.pdf Jan. 30, 2023, pp. 437-443.

Mishra et al., "Taxonomy of high impedance fault detection algorithm", Measurement, vol. 148, Aug. 19, 2019, pp. 1-19.

Short, T. A. (2012), "Advanced metering for phase identification, transformer identification, and secondary modeling"; IEEE Transactions on Smart Grid, 4(2), 651-658.

Taylor Spalt et al. "Automated AMI Meter-to-Transformer Connectivity" 6 pages.

Watson, J. D., Welch, J., & Watson, N. R. (2016), "Use of smart-meter data to determine distribution system topology"; The Journal of Engineering, 2016(5), 94-101.

Wei et al., "Detection and Feeder Identification of the High Impedance Fault at Distribution Networks Based on Synchronous Waveform Distortions", downloaded from internet https://arxiv.org/ftp/arxiv/papers/2005/2005.03411.pdf Jan. 30, 2023, pp. 1-8.

Weng, Y., Liao, Y., & Rajagopal, R. (2016), "Distributed energy resources topology identification via graphical modeling"; IEEE Transactions on Power Systems, 32(4), 2682-2694.

Alhussein et al., "Hybrid CNN-LSTM Model for Short-Term Individual Household Load Forecasting", IEEE Xplore, Oct. 1, 2020, 41 pages, retrieved from the Internet: https://ieeexplore.ieee.org/abstract/document/9210478.

Iqbal et al., "Estimation of Harmonic Emission of Electric Vehicles and Their Impact on Low Voltage Residential Network", MDPI, Jul. 31, 2021, retrieved from the internet: https://www.mdpi.com/2071-1050/13/15/8551, 36 pages.

Neuhold et al., "Results of Harmonic Interactions of EV Chargers and PV Systems", 23rd International Conference on Electricity Distribution, Jun. 15-18, 2015, retrieved from the Internet: https://www.researchgate.net/publication/277829818_RESULTS_OF_HARMONIC_INTERACTIONS_OF_EV_CHARGERS_AND_PV_SYSTEMS, 6 pages.

Said et al., "Analysis of distribution transformer losses and life expectancy using measured harmonic data", IEEE, Sep. 26-29, 2010, retreived from the internet: https://ieeexplore.ieee.org/document/5625404, 4 pages.

Sense, "Whole-home Energy Monitoring", 2023, retrieved from the Internet: https://sense.com/technology/.

Sense.com—"Embedded Intelligence on smart meters" Sense, Aug. 30, 2024. https://sense.com/technology/.

Yaghoobi et al., "Impact of high-frequency harmonics (0-9kHz) generated by grid-connected inverters on distribution transformers", ScienceDirect, International Journal of Electrical Power & Energy Systems, Nov. 2020, retrieved from the Internet: https://www.sciencedirect.com/science/article/abs/pii/S0142061519337688?via%3Dihub, 10 pages.

Diwold et al., "Network and feeder assignment of smart meters based on communication and measurement data", 2015 International Symposium on Smart Electric Distribution Systems and Technologies (EDST), IEEE, XP032812172, Sep. 8, 2015, pp. 541-546.

International Search Report and Written Opinion issued in connection with PCT International Patent Application No. PCT/US2023/081257 dated Mar. 27, 2024.

International Search Report and Written Opinion issued in connection with PCT International Patent Application No. PCT/US2023/081265 dated May 10, 2024 (13 pages).

(56) References Cited

OTHER PUBLICATIONS

International Search Report and Written Opinion on PCT International Patent Application No. PCT/US2023/081256 dated Mar. 28, 2024 (15 pages).
International Preliminary Report on Patentability issued in connection with International Patent Application No. PCT/US2023/081256 dated Jun. 12, 2025.
International Preliminary Report on Patentability issued in connection with International Patent Application No. PCT/US2023/081257 dated Jun. 12, 2025.
International Preliminary Report on Patentability issued in connection with International Patent Application No. PCT/US2023/081265 dated Jun. 12, 2025.
Luan et al., "Distribution Network Topology Error Correction Using Smart Meter Data Analytics", IEEE Power & Energy Society General Meeting, Vancouver, BC, Canada, 2013, pp. 1-5.
Short, Tom A., "Advanced Metering for Phase Identification, Transformer Identification, and Secondary Modeling", IEEE Transactions on Smart Grid, vol. 4, No. 2, Jun. 2013, pp. 651-658.
US Non-Final Office Action on U.S. Appl. No. 18/207,464 dated Jan. 12, 2026.
Watson et al., "Use of smart-meter data to determine distribution system topology", J Eng., 2016, vol. 2016, No. 5, pp. 94-101.
US Non-Final Office Action on U.S. Appl. No. 18/223,756 dated Mar. 19, 2026.
Woodman et al., "Modeling Harmonic Impacts of Electric Vehicle Chargers on Distribution Networks", 2018 IEEE Energy Conversion Congress and Exposition (ECCE), Portland, OR, 2018, pp. 2774-2781.

* cited by examiner

300

500

ELECTRICAL GRID ANOMALY DETECTION, CLASSIFICATION, AND PREDICTION

CROSS-REFERENCES TO RELATED APPLICATIONS

This application claims the benefit of priority under 35 U.S.C. § 119 to U.S. Provisional Patent Application No. 63/428,473, filed Nov. 29, 2022, and U.S. Provisional Patent Application No. 63/453,234, filed Mar. 20, 2023, each of which is hereby incorporated by reference herein in its entirety.

FIELD OF THE DISCLOSURE

This disclosure relates generally to systems and methods for detecting, classifying, and predicting anomalies in an electrical grid.

BACKGROUND

Utility distribution grids can use meters to observe or measure utility delivery or consumption in the grid. These meters, among other components within utility distribution grids, can collect samples of power delivery or consumption over time.

BRIEF SUMMARY OF THE DISCLOSURE

Anomalies in a utility grid (e.g., electric grid) can manifest in deviations of current or voltage waveforms from their ideal or desired forms. These anomalies may be caused by equipment malfunctions or failures at various locations within the utility grid. The presence of the anomalies can cause a reduction in power quality delivered or supplied to various loads (e.g., power consumption devices or entities) which can shorten the useful life of the equipment or cause interruptions in electricity. In some cases, if the presence of anomalies is caused by equipment in the utility grid, the presence of these anomalies may indicate an impending fault within the utility grid, which may potentially trigger an outage. Power outages or low power quality in the utility grid can negatively affect a system average interruption frequency index (SAIFI) score.

The systems and methods of the technical solution discussed herein can detect and classify anomalies. The systems and methods can utilize measurement devices configured to perform measurements or obtain samples at a relatively high time resolution (e.g., at or above 1 kHz or 10 kHz sampling rate). The measurement devices can be positioned at various locations within the utility grid (e.g., on feeders or other power transmission or distribution lines). The measurement devices can capture or record electrical waveforms (e.g., voltage or current waveforms) to detect any anomaly in the measurement. An anomaly can refer to an instance or an event in which the characteristics or behavior of electricity deviates from the expected or predicted characteristics (e.g., trend) at least beyond a predetermined threshold, which can potentially cause changes in power, voltage, current, or consumption of electricity. The systems and methods can analyze the waveforms to detect, classify, or predict anomalies within the utility grid, for instance, at the substation within the utility grid. By performing these features, the systems and methods can assist in identifying or targeting and fixing the underlying issue at the source, performing a prediction to prevent or minimize outages ahead of their occurrences, or maintaining relatively high power quality.

In one aspect, this disclosure is directed to a system for anomaly detection, classification, and prediction. The system can include one or more processors coupled with memory. The one or more processors can identify voltage waveform data corresponding to electricity distributed over a utility grid and measured by a metering device. The one or more processors can detect, based on a comparison with baseline voltage waveform data, an anomaly in at least a portion of the voltage waveform data. The one or more processors can generate spectrogram data for the at least the portion of the voltage waveform data comprising the anomaly. The one or more processors can determine, via a model trained with machine learning, a type of the anomaly based on the spectrogram data. The one or more processors can provide an indication of the type of the anomaly to cause an action to be performed on the utility grid responsive to determination of the type of anomaly.

The one or more processors can determine the type of the anomaly corresponds to at least one of sag, swell, interruption, flicker, oscillatory transient, harmonics, or notch. The one or more processors can receive the voltage waveform data comprising one or more metrics of the electricity over a first time window and a second time window. The one or more processors can determine the baseline voltage waveform data based on first values of the one or more metrics in the first time window. The one or more processors can detect the anomaly in the at least the portion of the voltage waveform data in the second time window subsequent to the first time window based on a comparison of second values of the one or more metrics in the second time window with the first values.

The system can include a metering system. The metering system can include the one or more processors coupled with memory. The metering system can include the metering device to measure the electricity distributed over the utility grid to generate the voltage waveform data. The system can include a data processing system comprising the one or more processors coupled with the memory, the data processing system remote from the metering device.

The one or more processors can determine a duration of the anomaly based on the at least the portion of the voltage waveform data comprising the anomaly. The one or more processors can determine a magnitude of the anomaly. The one or more processors can generate a signature identifier for the anomaly based on the type of the anomaly, the duration of the anomaly, and the magnitude of the anomaly. The one or more processors can select the action to be performed on the utility grid based on the signature identifier.

The system can include a data processing system remote from the metering device. The data processing system can receive the signature identifier. The data processing system can correlate a grid event with the signature identifier based on a log of historical grid events and signature identifiers. The data processing system can select the action responsive to the correlated grid event.

The one or more processors can identify second voltage waveform data corresponding to the electricity distributed over the utility grid and measured by a second metering device different from the metering device. The one or more processors can determine that a second anomaly in at least a portion of the second voltage waveform data corresponds to the type of the anomaly in the voltage waveform data via classification of second spectrogram data generated for the at least the portion of the second voltage waveform data. The one or more processors can verify the type of the anomaly originated on the utility grid responsive to the classification of the second anomaly.

The one or more processors can identify second voltage waveform data corresponding to the electricity distributed over the utility grid and measured by a second metering device different from the metering device. The one or more processors can determine that a second anomaly in at least a portion of the second voltage waveform data corresponds to a second type via classification of second spectrogram data generated for the at least the portion of the second voltage waveform data. The one or more processors can determine, responsive to the type of the anomaly being different from the second type of the second anomaly, a likelihood that a cause of the anomaly is a load at a location of the metering device that measured the voltage waveform data.

In another aspect, this disclosure is directed to a method for anomaly detection, classification, and prediction. The method can include identifying, by one or more processors coupled with memory, voltage waveform data corresponding to electricity distributed over a utility grid and measured by a metering device. The method can include detecting, by the one or more processors, based on a comparison with baseline voltage waveform data, an anomaly in at least a portion of the voltage waveform data. The method can include generating, by the one or more processors, spectrogram data for the at least the portion of the voltage waveform data comprising the anomaly. The method can include determining, by the one or more processors via a model trained with machine learning, a type of the anomaly based on the spectrogram data. The method can include providing, by the one or more processors, an indication of the type of the anomaly to cause an action to be performed on the utility grid responsive to determination of the type of anomaly.

The method can include determining, by the one or more processors, the type of the anomaly corresponds to at least one of sag, swell, interruption, flicker, oscillatory transient, harmonics, or notch. The method can include receiving, by the one or more processors, the voltage waveform data comprising one or more metrics of the electricity over a first time window and a second time window. The method can include determining, by the one or more processors, the baseline voltage waveform data based on first values of the one or more metrics in the first time window. The method can include detecting, by the one or more processors, the anomaly in the at least the portion of the voltage waveform data in the second time window subsequent to the first time window based on a comparison of second values of the one or more metrics in the second time window with the first values.

The method can include determining, by the one or more processors, a duration of the anomaly based on the at least the portion of the voltage waveform data comprising the anomaly. The method can include determining, by the one or more processors, a magnitude of the anomaly. The method can include generating, by the one or more processors, a signature identifier for the anomaly based on the type of the anomaly, the duration of the anomaly, and the magnitude of the anomaly.

The method can include selecting, by the one or more processors, the action to be performed on the utility grid based on the signature identifier. The method can include receiving, by a data processing system remote from the metering device, the signature identifier. The method can include correlating, by the data processing system, a grid event with the signature identifier based on a log of historical grid events and signature identifiers. The method can include selecting, by the data processing system, the action responsive to the correlated grid event.

The method can include identifying, by the one or more processors, second voltage waveform data corresponding to the electricity distributed over the utility grid and measured by a second metering device different from the metering device. The method can include determining, by the one or more processors, that a second anomaly in at least a portion of the second voltage waveform data corresponds to the type of the anomaly in the voltage waveform data via classification of second spectrogram data generated for the at least the portion of the second voltage waveform data. The method can include verifying, by the one or more processors, the type of the anomaly originated on the utility grid responsive to the classification of the second anomaly.

The method can include identifying, by the one or more processors, second voltage waveform data corresponding to the electricity distributed over the utility grid and measured by a second metering device different from the metering device. The method can include determining, by the one or more processors, that a second anomaly in at least a portion of the second voltage waveform data corresponds to a second type via classification of second spectrogram data generated for the at least the portion of the second voltage waveform data. The method can include determining, by the one or more processors, responsive to the type of the anomaly being different from the second type of the second anomaly, a likelihood that a cause of the anomaly is a load at a location of the metering device that measured the voltage waveform data.

In yet another aspect, this disclosure is directed to a non-transitory computer readable storage medium for anomaly detection, classification, and prediction. The non-transitory computer readable storage medium can store processor executable instructions that, when executed by one or more processors, cause the one or more processors to: identify voltage waveform data corresponding to electricity distributed over a utility grid and measured by a metering device; detect, based on a comparison with baseline voltage waveform data, an anomaly in at least a portion of the voltage waveform data; generate spectrogram data for the at least the portion of the voltage waveform data comprising the anomaly; determine, via a model trained with machine learning, a type of the anomaly based on the spectrogram data; and provide an indication of the type of the anomaly to cause an action to be performed on the utility grid responsive to determination of the type of anomaly.

The instructions can include instructions to: determine the type of the anomaly corresponds to at least one of sag, swell, interruption, flicker, oscillatory transient, harmonics, or notch.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE FIGURES

The accompanying drawings are not intended to be drawn to scale. Like reference numbers and designations in the various drawings indicate like elements having similar structure or functionality. For purposes of clarity, not every component may be labeled in every drawing. In the drawings.

Figure 1:
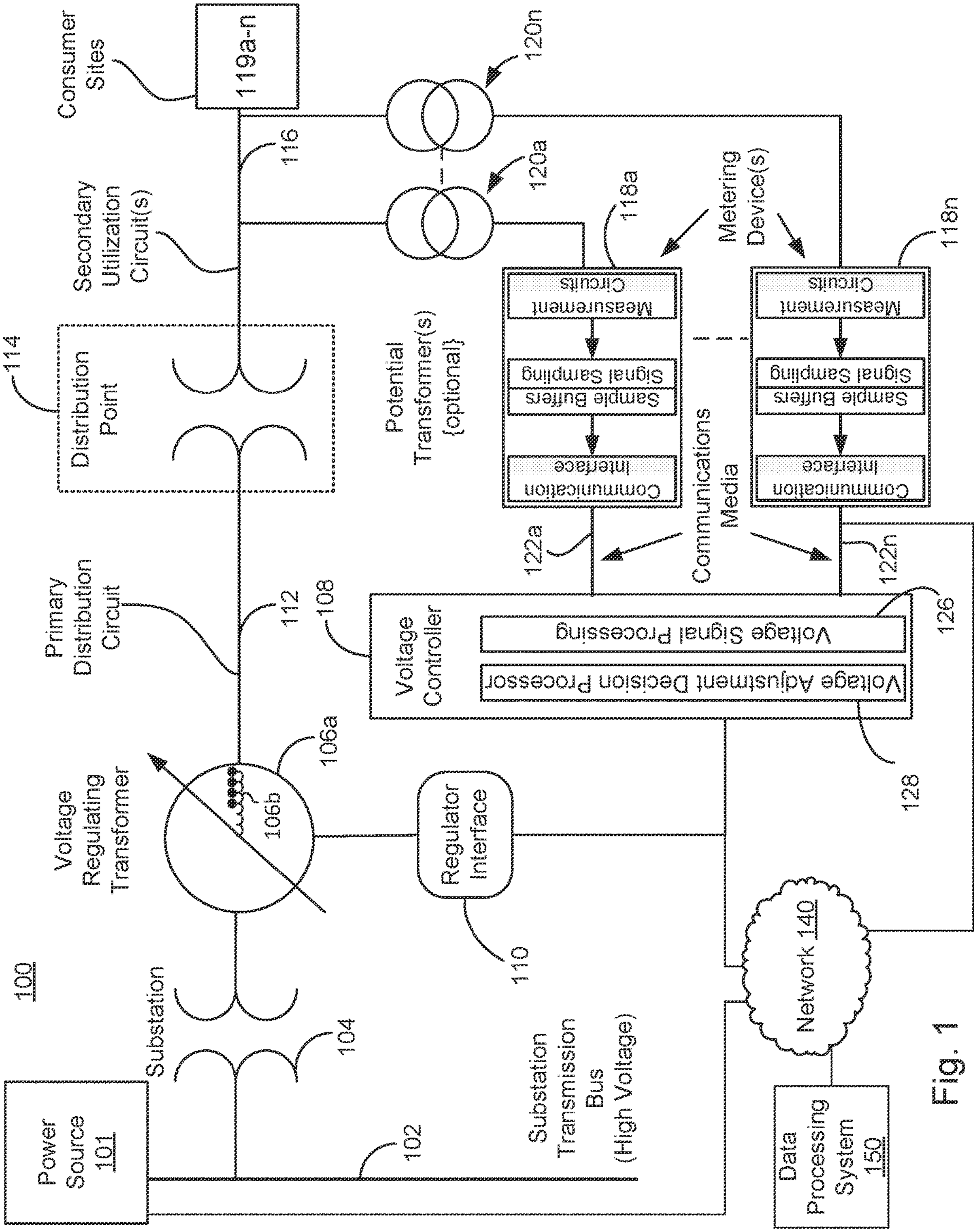
FIG. 1 is a block diagram depicting an illustrative utility grid, in accordance with an implementation.

The features and advantages of the present solution will become more apparent from the detailed description set forth below when taken in conjunction with the drawings, in which like reference characters identify corresponding elements throughout. Other features, aspects, and advantages of the subject matter will become apparent from the description, the drawings, and the claims.

DETAILED DESCRIPTION

Following below are more detailed descriptions of various concepts related to, and implementations of, methods, apparatuses, and systems of anomaly detection, classification, and prediction. The various concepts introduced above and discussed in greater detail below may be implemented in any of numerous ways.

The systems and methods of this technical solution can detect, classify, and predict anomalies on a utility grid, such as an electricity distribution grid. The systems and methods can utilize measurement devices configured to perform measurements or obtain samples at a relatively high time resolution (e.g., at or above 1 kHz or 10 kHz sampling rate). The measurement devices can be positioned at various locations within the utility grid (e.g., on feeders or other power transmission or distribution lines, such as at a substation). The measurement devices can capture or record electrical waveforms (e.g., voltage or current waveforms) to detect any anomaly in the measurement. The systems and methods can analyze the waveforms to detect, classify, or predict anomalies within the utility grid. By performing these features, the systems and methods can assist in identifying or targeting and fixing the underlying issue at the source, performing a prediction to prevent or minimize outages ahead of their occurrences, or maintaining relatively high power quality. For example, the systems and methods can facilitate or allow the prediction of equipment failures within the utility grid, such that grid operators can perform maintenance on the equipment prior to the failures, thereby preventing potential power outages at various location within the utility grid.

FIG. 1 illustrates an example utility distribution environment. The utility distribution environment can include a utility grid 100. The utility grid 100 can include an electricity distribution grid with one or more devices, assets, or digital computational devices and systems, such as a data processing system 150. In brief overview, the utility grid 100 includes a power source 101 that can be connected via a subsystem transmission bus 102 and/or via substation transformer 104 to a voltage regulating transformer 106*a*. The voltage regulating transformer 106*a* can be controlled by voltage controller 108 with regulator interface 110. Voltage regulating transformer 106*a* can be optionally coupled on primary distribution circuit 112 via optional distribution transformer 114 to secondary utilization circuits 116 and to one or more electrical or electronic devices 119. Voltage regulating transformer 106*a* can include multiple tap outputs 106*b* with each tap output 106*b* supplying electricity with a different voltage level. The utility grid 100 can include monitoring devices 118*a*-118*n* that can be coupled through optional potential transformers 120*a*-120*n* to secondary utilization circuits 116. The monitoring or metering devices 118*a*-118*n* can detect (e.g., continuously, periodically, based on a time interval, responsive to an event or trigger) measurements and continuous voltage signals of electricity supplied to one or more electrical devices 119 connected to circuit 112 or 116 from a power source 101 coupled to bus 102. A voltage controller 108 can receive, via a communication media 122, measurements obtained by the metering devices 118*a*-118*n*, and use the measurements to make a determination regarding a voltage tap settings, and provide an indication to regulator interface 110. The regulator interface can communicate with voltage regulating transformer 106*a* to adjust an output tap level 106*b*.

The utility grid 100 can include a power source 101. The power source 101 can include a power plant such as an installation configured to generate electrical power for distribution. The power source 101 can include an engine or other apparatus that generates electrical power. The power source 101 can create electrical power by converting power or energy from one state to another state. In some embodiments, the power source 101 can be referred to or include a power plant, power station, generating station, powerhouse or generating plant. In some embodiments, the power source 101 can include a generator, such as a rotating machine that converts mechanical power into electrical power by creating relative motion between a magnetic field and a conductor. The power source 101 can use one or more energy source to turn the generator including, e.g., fossil fuels such as coal, oil, and natural gas, nuclear power, or cleaner renewable sources such as solar, wind, wave and hydroelectric.

In some embodiments, the utility grid 100 includes one or more substation transmission bus 102. The substation transmission bus 102 can include or refer to transmission tower, such as a structure (e.g., a steel lattice tower, concrete, wood, etc.), that supports an overhead power line used to distribute electricity from a power source 101 to a substation 104 or distribution point 114. Transmission towers 102 can be used in high-voltage AC and DC systems and come in a wide variety of shapes and sizes. In an illustrative example, a transmission tower can range in height from 15 to 55 meters or more. Transmission towers 102 can be of various types including, e.g., suspension, terminal, tension, and transposition. In some embodiments, the utility grid 100 can include underground power lines in addition to or instead of transmission towers 102.

In some embodiments, the utility grid 100 includes a substation 104 or electrical substation 104 or substation transformer 104. A substation can be part of an electrical generation, transmission, and distribution system. In some embodiments, the substation 104 transform voltage from high to low, or the reverse, or performs any of several other functions to facilitate the distribution of electricity. In some embodiments, the utility grid 100 can include several substations 104 between the power plant 101 and the consumer electoral devices 119 with electric power flowing through them at different voltage levels.

The substations 104 can be remotely operated, supervised and controlled (e.g., via a supervisory control and data acquisition system or data processing system 150). A substation can include one or more transformers to change voltage levels between high transmission voltages and lower distribution voltages, or at the interconnection of two different transmission voltages.

The regulating transformer 106 can include: (1) a multi-tap autotransformer (single or three phase), which are used for distribution; or (2) on-load tap changer (three phase transformer), which can be integrated into a substation transformer 104 and used for both transmission and distribution. The illustrated system described herein can be implemented as either a single-phase or three-phase distribution system. The utility grid 100 can include an alternating current (AC) power distribution system and the term voltage can refer to an "RMS Voltage", in some embodiments.

The utility grid 100 can include a distribution point 114 or distribution transformer 114, which can refer to an electric power distribution system. In some embodiments, the distribution point 114 can be a final or near final stage in the delivery of electric power. For example, the distribution point 114 can carry electricity from the transmission system (which can include one or more transmission towers 102) to individual consumers 119. In some embodiments, the distribution system can include the substations 104 and connect to the transmission system to lower the transmission voltage to medium voltage ranging between 2 kV and 35 kV with the use of transformers, for example. Primary distribution lines or circuit 112 carry this medium voltage power to distribution transformers located near the customer's premises 119. Distribution transformers can further lower the voltage to the utilization voltage of appliances and can feed several customers 119 through secondary distribution lines or circuits 116 at this voltage. Commercial and residential customers 119 can be connected to the secondary distribution lines through service drops. In some embodiments, customers demanding high load can be connected directly at the primary distribution level or the sub-transmission level.

The utility grid 100 can include or couple to one or more consumer sites 119. Consumer sites 119 can include, for example, a building, house, shopping mall, factory, office building, residential building, commercial building, stadium, movie theater, etc. The consumer sites 119 can be configured to receive electricity from the distribution point 114 via a power line (above ground or underground). A consumer site 119 can be coupled to the distribution point 114 via a power line. The consumer site 119 can be further coupled to a site meter 118*a-n* or advanced metering infrastructure ("AMI"). The site meter 118*a-n* can be associated with a controllable primary circuit segment 112. The association can be stored as a pointer, link, field, data record, or other indicator in a data file in a database.

The utility grid 100 can include site meters 118*a-n* or AMI. Site meters 118*a-n* can measure, collect, and analyze energy usage, and communicate with metering devices such as electricity meters, gas meters, heat meters, and water meters, either on request or on a schedule. Site meters 118*a-n* can include hardware, software, communications, consumer energy displays and controllers, customer associated systems, Meter Data Management (MDM) software, or supplier business systems. In some embodiments, the site meters 118*a-n* can obtain samples of electricity usage in real time or based on a time interval, and convey, transmit or otherwise provide the information. In some embodiments, the information collected by the site meter can be referred to as meter observations or metering observations and can include the samples of electricity usage. In some embodiments, the site meter 118*a-n* can convey the metering observations along with additional information such as a unique identifier of the site meter 118*a-n*, unique identifier of the consumer, a time stamp, date stamp, temperature reading, humidity reading, ambient temperature reading, etc. In some embodiments, each consumer site 119 (or electronic device) can include or be coupled to a corresponding site meter or monitoring device 118*a*-118*n*.

Monitoring devices 118*a*-118*n* can be coupled through communications media 122*a*-122*n* to voltage controller 108. Voltage controller 108 can compute (e.g., discrete-time, continuously or based on a time interval or responsive to a condition/event) values for electricity that facilitates regulating or controlling electricity supplied or provided via the utility grid. For example, the voltage controller 108 can compute estimated deviant voltage levels that the supplied electricity (e.g., supplied from power source 101) will not drop below or exceed as a result of varying electrical consumption by the one or more electrical devices 119. The deviant voltage levels can be computed based on a predetermined confidence level and the detected measurements. Voltage controller 108 can include a voltage signal processing circuit 126 that receives sampled signals from metering devices 118*a*-118*n*. Metering devices 118*a*-118*n* can process and sample the voltage signals such that the sampled voltage signals are sampled as a time series (e.g., uniform time series free of spectral aliases or non-uniform time series).

Voltage signal processing circuit 126 can receive signals via communications media 122*a-n* from metering devices 118*a-n*, process the signals, and feed them to voltage adjustment decision processor circuit 128. Although the term "circuit" is used in this description, the term is not meant to limit this disclosure to a particular type of hardware or design, and other terms known generally known such as the term "element", "hardware", "device" or "apparatus" could be used synonymously with or in place of term "circuit" and can perform the same function. For example, in some embodiments the functionality can be carried out using one or more digital processors, e.g., implementing one or more digital signal processing algorithms. Adjustment decision processor circuit 128 can determine a voltage location with respect to a defined decision boundary and set the tap position and settings in response to the determined location. For example, the adjustment decision processing circuit 128 in voltage controller 108 can compute a deviant voltage level that is used to adjust the voltage level output of electricity supplied to the electrical device. Thus, one of the multiple tap settings of regulating transformer 106 can be continuously selected by voltage controller 108 via regulator interface 110 to supply electricity to the one or more electrical devices based on the computed deviant voltage level. The voltage controller 108 can also receive information about voltage regulator transformer 106*a* or output tap settings 106*b* via the regulator interface 110. Regulator interface 110 can include a processor-controlled circuit for selecting one of the multiple tap settings in voltage regulating transformer 106 in response to an indication signal from voltage controller 108. As the computed deviant voltage level changes, other tap settings 106*b* (or settings) of regulating transformer 106*a* are selected by voltage controller 108 to change the voltage level of the electricity supplied to the one or more electrical devices 119.

The network 140 can be connected via wired or wireless links. Wired links can include Digital Subscriber Line (DSL), coaxial cable lines, or optical fiber lines. The wireless links can include BLUETOOTH, Wi-Fi, Worldwide Interoperability for Microwave Access (WiMAX), an infrared channel or satellite band. The wireless links can also include any cellular network standards used to communicate among mobile devices, including standards that qualify as 1G, 2G, 3G, or 4G. The network standards can qualify as one or more generation of mobile telecommunication standards by fulfilling a specification or standards such as the specifications maintained by International Telecommunication Union. The 3G standards, for example, can correspond to the International Mobile Telecommunications-2000 (IMT-2000) specification, and the 4G standards can correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards can use various channel access methods e.g., FDMA, TDMA, CDMA, or SDMA. In some embodiments, different types of data can be transmitted via different links and standards. In other embodiments, the same types of data can be transmitted via different links and standards.

The network 140 can be any type and/or form of network. The geographical scope of the network 140 can vary widely and the network 140 can be a body area network (BAN), a personal area network (PAN), a local-area network (LAN), e.g., Intranet, a metropolitan area network (MAN), a wide area network (WAN), or the Internet. The topology of the network 140 can be of any form and can include, e.g., any of the following: point-to-point, bus, star, ring, mesh, or tree. The network 140 can be an overlay network which is virtual and sits on top of one or more layers of other networks 140. The network 140 can be of any such network topology as known to those ordinarily skilled in the art capable of supporting the operations described herein. The network 140 can utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite can include application layer, transport layer, internet layer (including, e.g., IPv6), or the link layer. The network 140 can be a type of a broadcast network, a telecommunications network, a data communication network, or a computer network.

One or more components, assets, or devices of utility grid 100 can communicate via network 140. The utility grid 100 can use one or more networks, such as public or private networks. The utility grid 100 can communicate or interface with a data processing system 150 designed and constructed to communicate, interface, or control the utility grid 100 via network 140. Each asset, device, or component of utility grid 100 can include one or more computing devices 700 or a portion of computing device 700 or some or all functionality of computing device 700.

The data processing system 150 can reside on a computing device of the utility grid 100, or on a computing device or server external from, or remote from the utility grid 100. The data processing system 150 can reside or execute in a cloud computing environment or distributed computing environment. The data processing system 150 can reside on or execute on multiple local computing devices located throughout the utility grid 100. For example, the utility grid 100 can include multiple local computing devices each configured with one or more components or functionality of the data processing system 150. In some cases, the data processing system 150 may be referred to as a server or a cloud computing device configured to process information received from one or more devices or components within the utility grid 100, among other environments in communication via the network 140.

Each of the components of the data processing system 150 can be implemented using hardware or a combination of software and hardware. Each component of the data processing system 150 can include logical circuitry (e.g., a central processing unit or CPU) that responds to and processes instructions fetched from a memory unit. Each component of the data processing system 150 can include or use a microprocessor or a multi-core processor. A multi-core processor can include two or more processing units on a single computing component. Each component of the data processing system 150 can be based on any of these processors, or any other processor capable of operating as described herein. Each processor can utilize instruction level parallelism, thread level parallelism, different levels of cache, etc. For example, the data processing system 150 can include at least one logic device such as a computing device or server having at least one processor to communicate via the network 140.

The components and elements of the data processing system 150 can be separate components, a single component, or part of the data processing system 150. For example, individual components or elements of the data processing system 150 can operate concurrently to perform at least one feature or function discussed herein. In another example, components of the data processing system 150 can execute individual instructions or tasks. The components of the data processing system 150 can be connected or communicatively coupled to one another. The connection between the various components of the data processing system 150 can be wired or wireless, or any combination thereof. Counterpart systems or components can be hosted on other computing devices.

The data processing system 150 can communicate with one or more metering devices 118 via the network 140. The data processing system 150 can obtain measurements from the one or more metering devices 118 within the utility grid 100. Each metering device 118 can measure an analog voltage waveform at high sampling rates in order to accurately resolve them in digitized samples. For example, the metering devices 118 can measure the (e.g., voltage) waveform at 10 kHz or higher. The metering device 118 (or other devices at the grid edge configured to measure the waveform, such as the one or more electronic devices 119) can be one of or a part of edge devices at the grid edge. In some cases, the data processing system 150 can be a part of the edge devices configured or equipped with computational power to carry out the various computations. By utilizing the digitized waveforms at high sampling rates or resolutions (e.g., capturing high-time-resolution voltage data by the metering devices 118), the data processing system 150 can perform computation on metering points to determine the characteristics of the high-resolution voltage waveforms, among other features of the voltage waveforms discussed herein.

Figure 2:
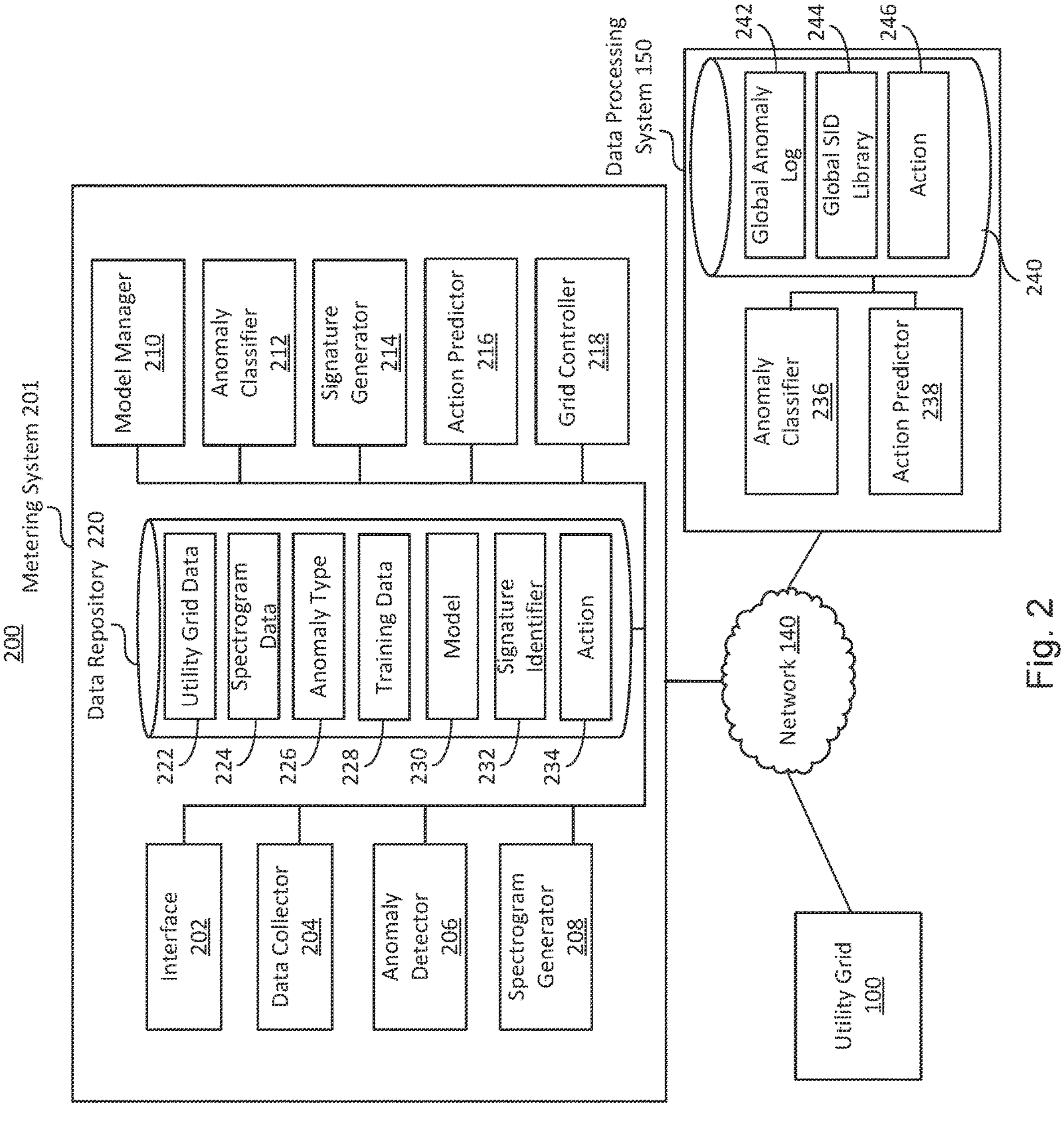
FIG. 2 is a block diagram illustrating an example system to detect, classify, or predict anomalies, in accordance with an implementation.

FIG. 2 illustrates a block diagram of an example system to detect, classify, and predict anomalies. The system 200 can include, interface with, access, or otherwise communicate with at least one utility grid 100, at least one data processing system 150, and at least one metering system 201. The metering system 201 can include one or more components (e.g., one or more processors, memory, databases, interfaces, etc.) configured to perform features or functionalities discussed herein for managing the utility grid 100 or localization on the utility grid 100. The metering system 201 can include or correspond to one or more metering devices 118 located in the utility grid 100. In some cases, the metering system 201 can be a computing device local to or remote from the utility grid 100 or the data processing system 150. In some other cases, the metering system 201 can be a part of or perform one or more functionalities similar to the data processing system 150. The metering system 201 can transmit or receive data to or from other components (e.g., utility grid 100 or data processing system 150) of the system 200 via the network 140. The utility grid 100 and the network 140 can be referred to in conjunction with FIG. 1. The one or more devices, components, or systems (e.g., data processing system 150, metering system 201 (or metering devices 118), etc.) of the utility grid 100 or the system 200 can be composed of hardware, software, or a combination of hardware and software components.

The metering system 201 can include or correspond to at least one metering device 118, such as one of the metering devices 118 configured to perform one or more features (e.g., collect and process electricity characteristics) for localization on the utility grid 100. The metering system 201 can be located within the utility grid 100. For example, the metering system 201 can be positioned, installed, or provided at a location downstream from the substation 104 on the utility grid 100 that distributes electricity. Other metering systems can be distributed or installed throughout the utility grid 100, configured to perform one or more features or functionalities similar to the metering system 201. In various cases, the metering systems (including the metering system 201) can correspond to or include edge devices within the utility grid 100.

The metering system 201 can receive and process data locally on the utility grid 100. In some cases, the metering system 201 can forward or delegate one or more features or functionalities to another computing device local to or remote from the utility grid 100. For instance, the metering system 201 can transmit data to the data processing system 150 executing in a cloud computing environment or distributed computing environment. In this case, the metering system 201 may perform a portion of the functionalities for processing information (e.g., electrical characteristics) local to the utility grid 100 and the data processing system 150 may perform another portion of the functionalities for processing the information (or processed data from the metering system 201).

The metering system 201 can include one or more components for anomaly detection, classification, and prediction within the utility grid 100 (e.g., electricity distribution grid), for instance, at least one interface 202, at least one data collector 204, at least one anomaly detector 206, at least one spectrogram generator 208, at least one model manager 210, at least one anomaly classifier 212, at least one signature generator 214, at least one action predictor 216, at least one grid controller 218, and at least one data repository 220. Each of the components (e.g., interface 202, data collector 204, anomaly detector 206, spectrogram generator 208, model manager 210, anomaly classifier 212, signature generator 214, action predictor 216, grid controller 218, or data repository 220) of the metering system 201 can be implemented using hardware or a combination of software and hardware. Each component of the metering system 201 can include logical circuitry (e.g., a central processing unit or CPU) that responds to and processes instructions fetched from a memory unit (e.g., memory 715 or storage device 725). Each component of the metering system 201 can include or use a microprocessor or a multi-core processor. A multi-core processor can include two or more processing units on a single computing component. Each component of the metering system 201 can be based on any of these processors, or any other processor capable of operating as described herein. Each processor can utilize instruction level parallelism, thread level parallelism, different levels of cache, etc. For example, the metering system 201 can include at least one logic device such as a computing device or server having at least one processor to communicate via the network 140.

The components and elements (e.g., at least one interface 202, at least one data collector 204, at least one anomaly detector 206, at least one spectrogram generator 208, at least one model manager 210, at least one anomaly classifier 212, at least one signature generator 214, at least one action predictor 216, at least one grid controller 218, and at least one data repository 220) of the metering system 201 can be separate components, a single component, or part of the metering system 201. For example, individual components or elements of the metering system 201 can operate concurrently to perform at least one feature or function discussed herein. In another example, components of the metering system 201 can execute individual instructions or tasks. In yet another example, the components of the metering system 201 can be a single component to perform one or more features or functions discussed herein. The components of the metering system 201 can be connected or communicatively coupled to one another, such as via the interface 202. The connection between the various components of the metering system 201 can be wired or wireless, or any combination thereof. Counterpart systems or components can be hosted on other computing devices.

The interface 202 can interface with the network 140, devices within the system 200 (e.g., data processing system 150 or utility grid 100), or components of the metering system 201. The interface 202 can include features and functionalities similar to the communication interface of one or more metering devices 118 to interface with the aforementioned components, such as in conjunction with FIG. 1. For example, the interface 202 can include standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). The interface 202 can include at least a built-in network adapter, network interface card, PCMCIA network card, EXPRESSCARD network card, card bus network adapter, wireless network adapter, USB network adapter, modem, or any other device suitable for interfacing one or more devices within the system 200 to any type of network capable of communication. The interface 202 can communicate with one or more aforementioned components to receive data from at least one of the utility grid 100 or the data processing system 150, such as data representative of electricity distribution to individual metering devices 118 within the utility grid 100 or instructions from the data processing system 150.

The data collector 204 can obtain or collect electrical data within the utility grid 100. The electrical data can include data samples of an electrical waveform corresponding to electricity (e.g., electrical signals) distributed at or to the location of the metering system 201 on the utility grid 100. In various cases, the data collector 204 can receive relatively high-resolution data, such as at least 1 kHz or 10 kHz of voltage data. For simplicity and for purposes of examples herein, the electrical data discussed herein can be voltage data, although other types of electrical data can be obtained, such as power or current electrical information.

For example, the data collector 204 can obtain voltage waveform data corresponding to electricity distributed over the utility grid 100 and measured by at least one of the metering devices 118. In this example, the metering system 201 can be in communication with the metering device 118 via the network 140. The interface 202 can receive the voltage waveform data from the metering device 118 periodically or in response to the metering device 118 measuring the voltage waveform data. The data collector 204 can obtain the voltage waveform data from the metering device 118 via the interface 202 in communication with the network 140.

In another example, the metering system 201 can correspond to or include the metering device 118, including the features or functionalities of the metering device 118. The metering system 201 (or the metering device 118) can include one or more sensors (e.g., voltage sensors) communicatively coupled with the metering system 201 or one or more components of the metering system 201. The one or more sensors can measure the electricity distributed over the utility grid 100 to generate the voltage waveform data. The one or more sensors can perform the measurement at a predefined sampling rate according to their configurations or capabilities.

The data collector 204 can receive the voltage waveform data including one or more metrics of the electricity over one or more time windows. For example, the data collector 204 can receive the voltage waveform data including metrics over at least one time interval. Each time interval can include multiple windows, such as a first time window, a second time window, etc. The duration of the time windows can be configured by the administrator or operator of the utility grid 100, the metering system 201, or the data processing system 150. The duration of the time windows can be similar to each other, such as 1 second, 5 seconds, or 10 seconds time window. For instance, for a 1-minute time interval, there can be 60 metrics corresponding to the respective 60 of the 1-second time windows. The metric can include or correspond to a value determined or computed using at least one statistical technique on the measurement (e.g., measured electricity distributed over the utility grid 100) over the time window. In some cases, multiple metrics can be computed or determined for each time window.

Examples of the statistical techniques can include, but are not limited to, fit root mean square error (RMSE) mean, fit RMSE standard deviation, fit mean absolute error (MAE), fit amplitude mean root mean square (RMS), fit amplitude standard deviation, fit frequency mean, fit frequency standard deviation, standard deviation, skewness, kurtosis, sum, sum log, largest harmonic, largest harmonic value, largest harmonic phase shift, second largest harmonic, second largest harmonic value, second largest harmonic phase shift, total harmonic distortion mean, total harmonic distortion mean, total harmonic distortion standard deviation, total harmonic distortion $90^{th}$ quantile, total harmonic distortion $80^{th}$ quantile, total harmonic distortion $10^{th}$ quantile, etc. A similar statistical technique can be used for the time window of a time interval. The determined metrics (e.g., values determined using the statistical techniques) over the time interval can represent or indicate the characteristic of electricity (e.g., depending on the utilized statistical technique) distributed over the utility grid 100.

The anomaly detector 206 can be configured or trained to detect or find anomalies in at least a portion of the voltage waveform data measured for the electricity distributed over the utility grid 100. The anomaly detector 206 can detect the anomalies by comparing expected voltage waveform data (e.g., baseline voltage waveform data considered normal) to various other windows of voltage waveform data. The anomaly detector 206 can continuously update the baseline voltage waveform data, for instance, based on additional voltage waveform data obtained by the data collector 204 or received from other metering systems receiving electricity from the same upstream component (e.g., metering systems downstream from the same secondary transformer).

The anomaly detector 206 can obtain the metrics (e.g., values) included in the voltage waveform data from the data collector 204. The anomaly detector 206 can obtain the metrics for each respective time window. For example, a time interval can include an integer number of windows, such that the duration of the time interval can correspond to one or multiple windows. The window can be represented as 0.1 seconds, 0.5 seconds, 1 second, etc., depending on the configuration of the metering system 201.

The anomaly detector 206 can determine the baseline voltage waveform data (e.g., trend or baseline values) based on voltage data collected by the metering system 201 or other metering systems. For example, when initiating the process of detecting anomalies, the anomaly detector 206 can start a predefined training period configurable by the operator. During the training period, the anomaly detector 206 (or the data collector 204) can gather the metrics determined over multiple time windows according to the voltage waveform data. After the training period, the anomaly detector 206 can aggregate the metrics determined during the training period (e.g., compute the average, mean, or median) to generate baseline values. The baseline values can be represented as the baseline voltage waveform data.

The anomaly detector 206 can store the baseline values in the data repository 220 local to the metering system 201, upload the baseline values to the data processing system 150 to be stored in a remote data repository, or send the baseline values to other metering systems. The baseline values can represent relatively normal metrics or voltage waveform data or data without anomalies. In some cases, the anomaly detector 206 may perform other pre-processing operations on the metrics gathered during the training period to obtain the baseline values, such as 1% low-value filter, 1% high-value filter, clustering, pattern tracking, etc. The anomaly detector 206 can continuously update the baseline values with additional information collected by the data collector 204. Hence, the baseline values can change over time to accommodate or reflect the changes in the waveform behavior/characteristic occurring over a certain time period of searching for anomalies in the waveform.

In some aspects, the anomaly detector 206 can receive voltage waveform data or metrics from other metering systems. The anomaly detector 206 can use the metrics from other metering systems to determine the baseline values, such as during or after the training period. In this case, the anomaly detector 206 may compute an average between the metrics obtained by the metering system 201 and the metrics from other metering systems. In some other aspects, the anomaly detector 206 may use baseline values determined by other metering systems or received from the data processing system 150. These other metering systems can receive electricity over the same upstream component, such as the same secondary transformer.

To detect the anomalies, the anomaly detector 206 can compare the baseline voltage waveform data (e.g., baseline metrics or values) with voltage waveform data (e.g., metrics or values) subsequent to the training period. The anomaly detector 206 can compare the features or characteristics of new voltage waveform data to the baseline voltage waveform data, such as the amplitude, frequency, period, or wavelength, among other types of information regarding the respective electrical waveform measured for one or more time windows. The anomaly detector 206 can perform the comparison responsive to obtaining the new voltage waveform data, determining new metrics, or at predetermined time intervals.

For example, the anomaly detector 206 may receive the voltage waveform data including one or more metrics of the electricity over a first time window and a second time window. The anomaly detector 206 can determine the baseline voltage waveform data based on first values of the one or more metrics in the first time window. In this case, the first time window can correspond to the training period. Subsequently, the anomaly detector 206 can compare the first values of the one or more metrics in the first time window to second values of the one or more metrics in the second time window. Based on the comparison, the anomaly detector 206 may detect the anomaly in the at least the portion of the voltage waveform data in the second time window subsequent to the first time window depending on differences from the baseline values.

In this case, the anomaly detector 206 can determine that there is an anomaly in the second time window if at least one of the values of the metrics in the second window deviates (or exceeds) from the baseline values by a predetermined threshold, such as 10%, 15%, 20% deviation, etc. If the difference is detected, the anomaly detector 206 can flag the batch of voltage waveform data (e.g., one or more windows) as containing an anomaly. Otherwise, if the anomaly detector 206 does not detect a difference exceeding the predetermined threshold, the anomaly detector 206 can determine that no anomaly is present in the second window. The anomaly detector 206 can compare the baseline values to the values of metrics from other windows to determine other potential anomalies.

The anomaly detector 206 can be configured to record or determine attributes or parameters associated with the anomalies, such as duration, magnitude, frequency, etc. The anomaly detector 206 can determine the duration of the anomaly based on at least a portion of the voltage waveform data including the anomaly. In some cases, the duration can be represented by the number of values indicative of the anomalies within one or more time windows. The magnitude can indicate the peak-to-peak voltage of at least a portion of the voltage waveform data including the anomaly. The frequency can be represented by the number of windows including the anomalies detected within a predetermined time period, such as 30 minutes, 1 hour, 6 hours, etc.

In some cases, the anomaly detector 206 can be configured to use peer-to-peer communication to verify or determine whether the anomalies occur at the grid side or the load side, such as within the power transmission or distribution system or at the power consumption entity. For example, to separate grid-originating anomalies from anomalies caused by the load at the measurement location or relatively near the loads (e.g., near the metering system(s) 201), the anomaly detector 206 can use peer-to-peer communication to verify or confirm whether the nearby locations (e.g., neighboring metering systems 201 or neighboring components at the grid-side) also measured an anomaly (e.g., similar or different waveform characteristic). The neighboring metering systems may refer to one or more metering systems connected to the same upstream components or devices. In this case, if there is at least one nearby location at the grid side (e.g., another grid equipment) measuring or detecting the anomaly, the anomaly detector 206 can determine that the anomaly occurred at the grid side. If at least one nearby location of the load side measures the anomaly, the anomaly detector 206 can determine that the anomaly occurred at the load side. In some cases, if both the neighboring grid side component and load side component measure the anomaly, the data processing system 150 may determine that the anomaly originates on both the grid side and the load side, for example.

The metering system 201 can communicate, share, or provide access to information associated with the detected anomaly or computation involved to detect the anomaly to other devices, such as other metering systems or the data processing system 150, within the network 140. The shared information can include the parameters associated with the anomalies, or other characteristics of the voltage waveform. For example, the data processing system 150 can communicate the detected anomaly of the metering system 201 to another metering system. In another example, a first metering system can perform anomaly detection and communicate the detected information to at least one other metering system. In further examples, the metering system 201 may aggregate information related to the anomaly detection from other metering systems for batch upload to the data processing system 150 to reduce network traffic.

In some configurations, the duration of individual windows may be flexible according to whether an anomaly is detected for one or more windows. For example, the anomaly detector 206 may decrease the size of one or more windows associated with at least a portion of the voltage waveform data including the anomaly. Analyzing multiple smaller windows of voltage data can increase the granularity for identifying similarities or differences between the voltage waveform data including the anomaly and the baseline voltage waveform data. In another example, the anomaly detector 206 may combine subsequent windows associated with portions of the voltage waveform data that do not include an anomaly, such that sections of the voltage waveform data with or without the anomaly can be separated from each other.

The spectrogram generator 208 can generate a spectrogram or spectrogram data for at least a portion of the voltage waveform data including the anomaly. The portion of the voltage waveform data can correspond to a window. For example, the spectrogram generator 208 can preprocess at least a portion of the voltage waveform data associated with the anomaly. The preprocessing of the data can include slicing or padding the anomalous intervals to a relatively uniform duration (e.g., 0.25, 0.5, 0.75 seconds, or other durations). The data processing system 150 can transform the raw data (e.g., voltage waveform data) into spectrograms using Fourier transformation technique, among other techniques configured to transform data into a spectrogram.

The spectrogram generator 208 can obtain the portion of the voltage waveform data including the anomaly based on anomaly detection by the anomaly detector 206. The spectrogram generator 208 can generate a spectrogram for individual windows associated with at least one anomaly. The spectrogram generator 208 may not generate a spectrogram for other portions of the voltage waveform data that do not include an anomaly. The generated spectrogram can be used for classifying the type of the anomaly detected by the metering system 201. The spectrogram generator 208 can store the generated spectrogram in the data repository 220.

The model manager 210 can generate, train, or otherwise manage artificial intelligence (AI) or machine learning (ML) models (e.g., sometimes referred to as model(s)). The model manager 210 can manage the model used by the anomaly classifier 212 to classify the type of anomaly. The model manager 210 can generate the model using at least one suitable machine learning technique, such as a convolutional neural network (CNN), decision tree, etc. The model manager 210 can train the model for classification by using the at least one suitable machine learning technique on simulated data or historical data (e.g., segments or portions of historical voltage waveform data) associated with respective types of anomaly.

For example, the model manager 210 can obtain training data from the data repository 220 or remote data repository, such as from the data processing system 150. The training data can include simulated versions of the various types of anomalies or historical data (e.g., historical voltage waveform data) associated with various types of anomalies. In some cases, the training data can include historical spectrogram data (e.g., recorded or logged data during the operation of the metering system 201 within the utility grid 100) of different types of anomalies. The training data can include other types of data associated with one or more anomalies, configured to train the model for classification of the anomalies, such as unsupervised, semi-supervised, or supervised training data. In some other cases, the model manager 210 can obtain historical spectrogram data generated by the spectrogram generator 208 using portions of the historical voltage waveform data associated with the types of anomalies. The model manager 210 can use the historical data or simulated data as input (e.g., training data) for training via the at least one machine learning technique, such as CNN, the decision tree, etc. For instance, at least one of the CNN or the decision tree can be used to identify and correlate patterns or characteristics of the spectrogram data (or voltage waveform data) to historical data for classifying the anomaly.

Provided with the input, the model manager 210 can use the machine learning technique to train the model to identify patterns, characteristics, objects, or other values representative of each respective type of anomaly. The types of anomalies can include sag, swell, interruption, flicker, amplitude, oscillatory transient, harmonics, notch, etc. For simplicity and for purposes of providing examples herein, the model manager 210 may train the model using a predefined number of types of anomalies, although additional or other types of anomalies can be recognized or used for training or execution of the model. In some cases, certain types of anomalies may be a subclass of another type of anomaly, e.g., sag, swell, interrupt, or flicker may be subclasses of the amplitude anomaly. Although other types of machine learning techniques may be used, for simplicity and for providing examples herein, the CNN and the decision tree can be used.

For example, the CNN can be trained using simulated versions of the various types of anomaly (e.g., simulated data) discussed herein. The CNN may be trained using historical data from operations within the utility grid 100 recorded as certain types of anomaly. The model manager 210 can input at least one of the simulated data or the historical data as input for training the CNN. The CNN can be configured to output at least one of the anomaly classes, such as at least one of amplitude, oscillatory transient, harmonics, or notch. If the CNN identifies an amplitude anomaly, the model manager 210 can utilize a decision tree to categorize the anomaly into at least one of the subclasses of anomalies, such as at least one of sag, swell, interruption, or flicker.

In this example, the model manager 210 can train the decision tree using various features based on predetermined waveform amplitude thresholds. For instance, the decision tree can be configured to use four features including a first feature corresponding to a first amplitude threshold (e.g., a constant nominal amplitude, such as 1.1), a second feature corresponding to a second amplitude threshold (e.g., 0.98 of nominal amplitude), a third features corresponding to a third amplitude threshold (e.g., 0.2 nominal amplitude), and a fourth features corresponding to a distance threshold between two or more neighboring threshold (e.g., first and second threshold or second and third thresholds). For the first feature, the model manager 210 (executing the decision tree) can determine whether the amplitude is at or above the first threshold, outputting a binary 0 or 1 according to the determination. For the second feature, the model manager 210 can determine whether the amplitude is below the second threshold, outputting a binary 0 or 1 according to the determination. For the third feature, the model manager 210 can determine whether the amplitude is below the third threshold, outputting a binary 0 or 1 according to the determination. For the fourth feature, the model manager 210 can determine whether the maximum distance between at least two neighboring or adjacent thresholds is crossed, such as for 1.1 and 0.98 thresholds. The model manager 210 can determine the number of samples where the maximum distance between the two adjacent thresholds is crossed.

Further from the above examples, the amplitude can be measured based on the maximum value of each cycle within a window of the voltage waveform data including the anomaly. In this case, multiple values can be generated for each window (if the window is longer than one cycle), and more than one of the features (e.g., more than one of the first to third features) may be true, occur, or recorded simultaneously, for example. As discussed herein, the output of the classification (e.g., using the model) can include a vector of multiple values corresponding to the number of anomaly types (e.g., seven or more) on the interval [0,1], where one value can represent each anomaly class. For instance, a value closer to 1 can indicate a relatively higher likelihood that the corresponding anomaly type is detected, and a value closer to 0 can indicate a relatively lower likelihood that the corresponding anomaly type is detected. Multiple classes or types of anomalies can be detected simultaneously. In some cases, the amplitude classes (or subclasses) may be mutually exclusive.

In another example, for each respective type of anomaly, the model manager 210 can train the model to identify changes in the frequency or strength of the voltage (e.g., the delta of the voltage strength or frequency), how the frequency changes (e.g., gradual, instantaneous, incremental, or decremental, among others), the duration of the anomalies, etc., during the occurrence of the anomaly. In some cases, the training data can include baseline spectrogram data or baseline voltage waveform data for the model to distinguish between expected and irregular values (e.g., values deviating from the expected values). The model manager 210 can determine notable features associated with the type of anomaly based on their differences from the baseline data. Certain notable features may be shared for multiple types of anomalies, whereas some other features can be representative of a particular type of anomaly. According to the training data, the model can be trained to identify features of the spectrogram that represent a respective type of anomaly.

In some configurations, the model manager 210 can receive training data including historical data associated with multiple types of anomalies (e.g., within a time window). The training data may indicate the features shared between the multiple types of anomalies and features that represent a particular type of anomaly. In this case, the model manager 210 can train the model using the historical data associated with different combinations of the types of anomalies. Each combination can include two or more different types of anomalies. According to this training, the model can be configured to identify more than one type of anomaly for any given voltage waveform data.

The model manager 210 can store the model in or retrieve the model from the data repository 220. In some cases, the model may be trained by other metering systems or the data processing system 150. In such cases, the model manager 210 may receive the trained model from other devices or systems within the network 140. The model manager 210 can update or further train the model based on additional training data. The model manager 210 may update the model periodically, such as daily, weekly, monthly, etc. The model manager 210 may update the model responsive to receiving new training data or responsive to a command from the operator of the utility grid 100.

The anomaly classifier 212 can classify the detected anomaly into at least one of the types of anomalies using the model trained by the model manager 210. For example, the anomaly classifier 212 can receive the detection results (e.g., at least a portion of the voltage waveform data including the anomaly) from the anomaly detector 206. The detection result can be converted to the spectrogram data by the spectrogram generator 208. The anomaly classifier 212 can obtain the spectrogram data from the spectrogram generator 208. The anomaly classifier 212 can execute a model using the spectrogram data as input. In some cases, the anomaly classifier 212 may use the portion of the voltage waveform data including the anomaly as input, such as additionally or alternatively to the spectrogram data.

Responsive to executing the model, the anomaly classifier 212 can identify one or more features from the spectrogram data. The model can determine that the identified features are associated with one or more types of anomaly based on similarities (or differences) between the identified features and the training features (e.g., from the training data) indicative of one or more types of anomalies. The identified features from the spectrogram can be graphical features or variables indicative of the one or more types of anomalies based on the training data (e.g., baseline values or template images of historical spectrogram used to represent the type of anomaly). For instance, the anomaly classifier 212, executing the model, can determine the type of the anomaly corresponding to at least one of sag, swell, interruption, flicker, oscillatory transient, harmonics, notch, etc.

After determining the one or more types of anomalies, the anomaly classifier 212 can receive an output from the model indicating the one or more types of anomalies associated with the portion of the voltage waveform data. The output may be a vector value (e.g., classification vector). For example, if there are seven types of anomalies, each type of anomaly may be represented by a binary bit. If the model detects a first type of anomaly, the binary bit representation can be '1000000'. If the model detects a combination of a second type and a fifth type of anomalies, the binary bit representation can be '0100100', etc. In some cases, the types of anomalies can be represented by an integer number, such as '1' representing the first type, '2' representing the second type, '3' representing a third type, '8' representing a combination of the first type and the second type of anomalies, '9' representing a combination of the first type and the third type of anomalies, etc. The anomaly classifier 212 can receive other types of configurable output from the model to represent an indication of the one or more types of anomalies.

The model can output a range of values for each of the types of anomalies, such as from 0 to 1 (or 0 to 10, or 0 to 100) representing the likelihood of the detected anomaly being classified as the respective type of anomaly. For example, the model can compare or contrast similarities or differences between the features (e.g., values or imaging features) of the current spectrogram and one or more training spectrograms (e.g., training data). An exact match of the features indicative of a type of anomaly can be represented as a vector value of 1. If certain features indicative of the type of anomaly are similar (e.g., at or above 70% similarities), or if some features with relatively less weight (indicative of the type of anomaly) do not match (e.g., below 70% similarities), among other relatively minor differences, the model may assign or output a relatively high score for the likelihood of the type of anomaly, such as 0.8, 0.9, 0.95, etc. In another case, if a feature with a relatively higher weight (indicative of the type of anomaly) is not similar to the feature from the training data or if the relatively higher-weighted feature is not present, the model can assign a relatively low score for the likelihood of the type of anomaly, such as 0.3, 0.2, 0.1, etc. In such cases, the model may output a vector including multiple values, where values closer to 1 represent a higher likelihood that the portion of the voltage waveform data represents the respective type of anomaly and values closer to 0 represent a lower likelihood, for example.

In some other cases, the model may identify features of the spectrogram data (or the voltage waveform data) that do not exhibit similar trends, characteristics, or traits as those used for training the model. In such cases, the model may output an indication that the detected anomalies do not represent any of the predefined types of anomalies. In such cases, the model may output a '0', '0000000', or other indications for the anomaly classifier 212. The anomaly classifier 212 can store the output of the model in the data repository 220. In some cases, the anomaly classifier 212 can provide the input data and the output data of the model to be used as training data for the model of the metering system 201 or other metering systems.

The anomaly classifier 212 can verify that the type of anomaly originated on the utility grid 100 (e.g., caused by the device or component of the utility grid 100) based on data from at least one other metering system. For example, another voltage waveform data (e.g., second voltage waveform data) can be identified by another metering system (e.g., second metering system or metering device). The second voltage waveform data can correspond to the electricity distributed over the utility grid 100 and measured by the second metering system different from the metering system 201 (e.g., the first metering system). The time period associated with the second voltage waveform data can be similar or the same as the time period associated with the voltage waveform data identified by the metering system 201 (e.g., measured or captured at a similar timeframe). In some cases, the second metering system can include one or more components similar to the metering system 201 to perform similar features or functionalities. In some other cases, the metering system 201 can obtain the second voltage waveform data from the second metering system to perform the operations discussed herein.

For example, the metering system 201 (e.g., anomaly detector 206) or the second metering system can detect a second anomaly in at least a portion of the second voltage waveform data. The metering system 201 (e.g., using the spectrogram generator 208) or the second metering system can generate second spectrogram data for the at least the portion of the second voltage waveform data. The metering system 201 (e.g., using the anomaly classifier 212) or the second metering system can determine the type of anomaly of the second anomaly via classification of the second spectrogram data. If the second metering system performs the determination, the second metering system can provide the result to the metering system 201 for verification. Based on information from the second metering system, the metering system 201 can determine whether the type of the second anomaly corresponds to the same type of the anomaly in the voltage waveform data.

If the second anomaly corresponds to the type of the anomaly in the voltage waveform data, the metering system 201 can verify that the type of the anomaly originated on the utility grid 100 responsive to the classification of the second anomaly because multiple metering systems experience or determine the similar type of anomaly at similar time period. Otherwise, if the second anomaly does not correspond to the type of anomaly in the voltage waveform data, the metering system 201 can determine that the type of anomaly in the voltage waveform data does not originate on the utility grid 100.

For example, if the anomaly in the voltage waveform data is not registered or detected by another metering device 118 or another metering system relatively close to the metering system 201, the metering system 201 can determine that a load associated with the metering system 201 (e.g., load behind the metering device 118 that captured the anomaly) causes the anomaly. Hence, in this example, the anomaly signature in the voltage may not propagate to the other meter devices 118 (e.g., metering devices 118 that share similar upstream electrical equipment within the utility grid 100). Instead, the metering system 201 can determine a likelihood that the cause of the anomaly is a load at the location of the metering system 201 (or the metering device 118) that measured the voltage waveform data. The metering system 201 can determine the likelihood, for instance, according to a weighted sum (or in some cases, the ratio) of the number of metering devices 118 under the same upstream component (e.g., secondary transformer) that also detected the anomaly multiplied by their respective distance (e.g., determined via a global positioning system (GPS)) from the metering system 201 (or metering device 118) that recorded the anomaly.

The signature generator 214 can generate an anomaly signature and a signature identifier for the anomaly signature. The anomaly signature can be used to describe the anomaly and the one or more features of the anomaly. The signature identifier can be used as a search key, for instance, to identify the anomaly signature. For example, the signature generator 214 can generate an anomaly signature indicating one or more types of anomalies classified for the respective portion of the voltage waveform data. The signature generator 214 can include one or more features related to the anomaly as part of the anomaly signature, such as the duration of the anomaly, the magnitude of the anomaly, or other features detected by the anomaly detector 206.

The duration of the anomaly can be determined by the anomaly detector 206 based on at least one portion (e.g., window) of the voltage waveform data including the anomaly. If the anomaly extends across multiple consecutive windows or portions of the voltage waveform data, the anomaly detector 206 can determine the total duration of the anomaly across multiple windows that includes the anomaly. The magnitude of the anomaly can be determined based on at least one of the peak measurements of the voltage waveform, peak-to-peak measurements of the voltage waveform, frequency captured via the spectrogram, signal strength captured via the spectrogram associated with the anomaly, etc.

The signature generator 214 can generate a signature identifier for the anomaly based on the type of the anomaly, the duration of the anomaly, the magnitude of the anomaly, and other features configured to be included or captured with the type of anomaly. For example, the signature generator 214 can generate the signature identifier to include a vector value representing the one or more types of anomalies classified by the anomaly classifier 212. The signature generator 214 can generate the signature identifier to include a value representing the duration of the detected anomaly, the magnitude of the anomaly, etc. In some cases, the signature generator 214 can generate the signature identifier to include the date and time the anomaly is detected (e.g., start time of the anomaly). The signature generator 214 can store the signature identifier in the data repository 220. The signature generator 214 can send the signature identifier to other systems, such as other metering systems or the data processing system 150 to identify the anomaly signature according to the signature identifier. In some cases, the signature identifier can include or correspond to a sequence of identifiers representing the anomaly signature, a compressed version of the anomaly signature, or encrypted information based on the anomaly signature (e.g., to be decrypted by the data processing system 150). In some other cases, the signature identifier can include or correspond to a look-up key used to identify predetermined or known anomaly signatures associated with the signature identifier. In various cases, the signature identifiers can be generated according to the anomaly signature.

The action predictor 216 can determine or predict at least one action to be performed on the utility grid 100. The action predictor 216 can predict the action based on the anomaly signature and historical utility grid events (e.g., sometimes referred to as historical events). The historical events may be logged, recorded, or stored in the data repository 220 or a remote data repository (e.g., data repository 240). For example, individual historical events on the utility grid 100 may involve certain types of anomalies at varying magnitudes or durations, among other features. In this example, the individual historical events can be associated with their respective anomaly signature. Different grid events may produce or be identified by different anomaly signatures. The action predictor 216 can correlate at least the anomaly signature to at least one of the historical events. Based on the correlation to the at least one historical event, the action predictor 216 can identify a potential grid event that may occur according to the correlated historical event. As such, according to the predicted grid event, the action predictor 216 can select at least one predefined action to be performed on the utility grid 100 prior to the occurrence of the predicted grid event.

The action predictor 216 can determine the at least one action to be performed based on the anomaly signature from multiple metering systems (e.g., metering devices 118) and the historical events of the utility grid 100. For example, the action predictor 216 can receive anomaly signatures from multiple metering systems of the utility grid 100. The action predictor 216 can compare the types of anomalies detected, at a similar start time, and classified by the metering systems between each other. These metering systems can be located downstream from the same upstream device, such as a secondary transformer, distribution point, etc. If these metering systems detected the same type of anomaly as the metering system 201 (e.g., anomaly detector 206 or anomaly classifier 212), the action predictor 216 can determine that the anomaly originated on the utility grid 100 (e.g., caused by at least one device within the utility grid 100). If one or more of the metering systems detected different types of anomaly (or does not detect an anomaly) at a similar start time, the action predictor 216 can determine that the anomaly does not originate on the utility grid 100 and may likely be caused by the load at the location of the respective metering system, such as the metering system 201 or other metering systems detecting the anomaly.

The action predictor 216 can provide an indication of the selected action to the grid controller 218 to perform the action on the utility grid 100 or one or more components of the metering system 201, among other devices within the utility grid 100. The action can be stored in the data repository 220 or an external data repository (e.g., data repository 240). The action may include ignoring the detected anomaly, e.g., if the anomaly signature is associated with a known noise signature. The known noise signature can represent signals with distortion or a relatively low signal-to-noise ratio not related to equipment failure of the utility grid 100 or the load at the location of the metering system 201.

The action may include notifying one or more devices of the utility grid 100 depending on the anomaly signature. For instance, based on the correlation with the historical events, the action predictor 216 may determine that the anomaly signature is indicative of a precursor to a relatively major event, such as equipment failure, power outage, frequent power interruptions, disconnection of the electrical lines, etc. The action predictor 216 may notify the one or more devices including, for instance, the equipment of the utility grid 100, an operator device, or the data processing system 150 managed by an administrator or the utility operator.

The action may include logging or recording the anomaly signature into an anomaly log or storing the anomaly signature in the data repository 220 or the remote data repository. The action can include uploading or sending the logged anomaly signature to the data processing system 150 or other cloud computing devices, such as to further process the anomaly signature. In some cases, the action may include restarting at least one equipment within the utility grid 100 upstream from the metering system 201 to resolve the anomaly depending on the anomaly signature. The action can include scheduling a software update for one or more devices within the utility grid 100. The action may include notifying one or more devices of the utility grid 100 to schedule or perform maintenance on at least one utility equipment. In some other cases, if the anomaly (e.g., type of anomaly) is not known, the action can include sending the entire signature (e.g., at least one of voltage waveform data or spectrogram data) to the data processing system 150 for processing or classification. In some instances, the action can include notifying the operator or administrator of the unknown type of anomaly.

The grid controller 218 can perform the action selected by the action predictor 216. For example, according to the anomaly signature, the grid controller 218 can provide the signature identifier identifying the anomaly signature to the data processing system 150. Providing the signature identifier can include scheduling the signature identifier to upload to the data processing system 150. In this case, the grid controller 218 can enable the data processing system 150 to process the anomaly signature to determine an action (e.g., another action) to be performed. In another example, the grid controller 218 may discard or ignore the anomaly determined and classified by the metering system 201 based on the anomaly signature. In yet another example, the grid controller 218 may send a notification to one or more devices within the utility grid 100 indicating the precursor to an event that is expected to cause disruptions or failures during the utility operation. In further examples, the grid controller 218 may send an entire signature (e.g., at least one portion of the voltage waveform data or the spectrogram data) to the data processing system 150 if the type of anomaly is unknown.

The metering system 201 can include the data repository 220 to store information or data collected, measured, obtained, or otherwise received as discussed herein. The data repository 220 may be referred to as a data storage, database, memory device, etc. The data repository 220 can include at least a utility grid data storage 222, a spectrogram data storage 224, an anomaly type storage 226, a training data storage 228, a model storage 230, a signature identifier storage 232, and an action storage 234. The data repository 220 can include other types of storage to store information for anomaly detection, classification, or prediction. In some cases, information stored in the data repository 220 can be uploaded to or synced with the data repository 240 of the data processing system 150, among other cloud storage devices, or downloaded to the data repository 220 for processing. In some other cases, the information stored in the data repository 220 may be local to the metering system 201. The data repository 220 can be accessed by one or more components (e.g., data collector 204, anomaly detector 206, spectrogram generator 208, model manager 210, anomaly classifier 212, signature generator 214, action predictor 216, or grid controller 218) of the metering system 201, or at least one external or remote device, such as other metering systems within the utility grid 100, the data processing system 150, etc.

The utility grid data storage 222 can include, store, or maintain information related to the utility grid 100 obtained, measured, or detected by the metering system 201 (e.g., interface 202 or data collector 204). For example, the utility grid data storage 222 can store electrical data received or measured by the data collector 204, such as the voltage waveform data measured by the metering system 201. The utility grid data storage 222 can store timestamps of when the data are logged or stored in the data repository 220. In some cases, the utility grid data storage 222 can include the identifier of the metering system 201, for instance, to be provided to the data processing system 150 during data transmission. In some other cases, the utility grid data storage 222 can include the geographical location of the metering system 201.

The spectrogram data storage 224 can include, store, or maintain the spectrogram data generated by the spectrogram generator 208. The spectrogram data can include values indicating at least the frequency, duration, and strength of the electrical waveform data. The spectrogram data can be represented by an image. The spectrogram data storage 224 can be accessed by one or more components of the metering system 201, such as the model manager 210 for training the model or the anomaly classifier 212 for classifying the anomaly. The spectrogram data storage 224 can store additional spectrogram data responsive to the metering system 201 measuring additional voltage waveform data.

The anomaly type storage 226 can include, store, or maintain the predetermined types of anomaly. The types of anomalies can include, for example, sag, swell, interruption, flicker, oscillatory transient, harmonics, or notch. A sag can refer to a decrease in root mean square (RMS) voltage magnitude for a relatively short duration (e.g., within a portion of the window), which may be an indication of a fault within the utility grid 100. A swell can refer to an increase in RMS voltage magnitude for a relatively short duration, which may potentially cause damage to electrical equipment. An interruption can refer to a duration of a break in electricity (e.g., electrical service), sometimes referred to as a power outage. The interruption may be an indication of a malfunction of at least one equipment within the utility grid 100 or a disconnection in at least one power line. A flicker can refer to a relatively short duration of voltage fluctuations. An oscillatory transient can refer to a relatively abrupt or sudden change in the steady-state condition of the electrical signal oscillating at a neutral system frequency, for example. The harmonics can refer to the variation of the frequencies of the electrical signal. A notch can correspond to a type of periodic waveform distortion produced when the electrical signal commutates from one phase to another, which may be an indication of a noise.

The anomaly type storage 226 can receive new or updated types of anomalies from the data processing system 150. The anomaly type storage 226 can remove existing types of anomalies responsive to receiving a command from the data processing system 150 indicating removing the one or more types of anomalies. The anomaly type storage 226 can be accessed by one or more components of the metering system 201, such as the anomaly classifier to classifier the anomaly as at least one of the types.

In some cases, the anomaly type storage 226 can store the type of anomalies identified by the anomaly classifier 212. For example, the anomaly classifier 212 can classify the anomaly as an output of the machine learning model. The anomaly type storage 226 can store the output of the model as the historical data, including the vector values representing one or more types of anomalies detected by the metering system 201.

The training data storage 228 can include, store, or maintain training data for training the model. The training data storage 228 can be accessed by the one or more components of the metering system 201, such as the model manager 210 for updating or training the model. The training data can include the types of anomalies, historical voltage waveform data associated with individual types of anomalies, historical spectrogram data associated with the historical voltage waveform data, etc. The training data storage 228 can store the historical events used by the action predictor 216 to select at least one action. The training data storage 228 can store the historical actions taken by metering systems or the data processing system 150 based on the historical events. In some cases, the training data storage 228 can store the outputs from the one or more components of the metering system 201 as part of the training data, such as the anomaly detected by the anomaly detector 206, the spectrogram data generated by the spectrogram generator 208, the type of anomaly classified by the anomaly classifier 212, anomaly signature generated by the signature generator 214, or the action selected or predicted by the action predictor 216. The training data stored in the training data storage 228 can be updated by the data processing system 150. The training data stored in the training data storage 228 may be updated with additional training data from other metering systems.

The model storage 230 can include, store, or maintain at least one model generated, trained, or managed by the model manager 210. For example, the model storage 230 can store a model generated by the model manager 210. The model storage 230 can be accessed by the model manager 210 to train or update the model. In some cases, the model storage 230 can delete at least one model based on a command from the data processing system 150 or the model manager 210. The model storage 230 can be accessed by the anomaly classifier 212 to classify the detected anomaly in at least a portion of the voltage waveform data or the spectrogram data. The model storage 230 can store one or more models generated or trained by the data processing system 150 or other metering systems. The model storage 230 can store other information or data related to the model, such as the configuration, types of machine learning techniques used to train individual models, etc.

The signature identifier storage 232 can include, store, or maintain signature identifiers indicative or representing the anomaly signature. The signature identifier storage 232 can receive and store the signature identifier generated by the signature generator 214. The signature identifier can include an indication of at least one of one or more types of anomalies classified by the anomaly classifier 212, the magnitude of the anomaly, the duration of the anomaly, the start time of the anomaly, etc. In some cases, the signature identifier storage 232 can store information related to the anomaly signature with the signature identifier. The signature identifier storage 232 can be accessed by the one or more components of the metering system 201, such as the action predictor 216 to facilitate the identification of the anomaly signature. The configuration or format of the signature identifier can be synced, predetermined, or shared across the metering systems or the data processing system 150, such that other systems can determine the anomaly signature generated by the metering system 201 using the signature identifier.

The action storage 234 can include, store, or maintain various actions selectable by the action predictor 216 or executable by the grid controller 218. The actions can include or correspond to executable codes, instructions, or commands for execution by the grid controller 218. The actions can be predetermined by the operator or the administrator of the utility grid 100. For example, the metering system 201 (and one or more other metering systems) may receive the predefined actions from the data processing system 150 to store locally in the action storage 234. The action storage 234 can store new or updated actions upon receiving the actions from the data processing system 150. The action storage 234 can remove at least one predefined action responsive to a command from the data processing system 150. In some cases, the action storage 234 can store similar types of actions as those stored in other metering systems or the data processing system 150 (e.g., the actions synched to other systems or devices).

The data processing system 150 can be remote from the utility grid 100 and the metering systems. The data processing system 150 can receive data from the one or more metering systems, such as the metering system 201. The data processing system 150 can receive data from the metering system 201, such as at least the portion of the voltage waveform data or the spectrogram data including the anomaly. In some cases, the data processing system 150 can receive the signature identifier from the metering system 201. By having the metering systems transmit one or more portions of the measured or collected data (instead of the high-resolution information recorded by the metering systems), the communication bandwidth or network resources consumed by the data processing system 150 and multiple metering systems 201 (or metering devices 118) can be reduced or maintained within a desired bandwidth threshold.

The data processing system 150 can include one or more components for at least anomaly detection or classification, among other functionalities discussed herein. The one or more components of the data processing system 150 can include, for instance, at least one anomaly classifier 236, at least one action predictor 238, and at least one data repository 240. The data repository 240 may be referred to as a memory device of the data processing system 150 or a remote database relative to the metering system 201. Each of the components (e.g., anomaly classifier 236, action predictor 238, or data repository 240) of the data processing system 150 can be implemented using hardware or a combination of software and hardware. The data processing system 150 can include one or more components configured to one or more features or functionalities similar to the metering system 201.

In some aspects, the data processing system 150 may correspond to the metering system 201. In some other aspects, some of the components of the data processing system 150 may correspond to components of the metering system 201, thereby allowing the data processing system 150 to perform similar features or functionalities as the metering system 201, among other metering systems. In various cases, the data processing system 150 can include other components to perform the features or functionalities discussed herein. For instance, the data processing system 150 may include components configured to interface with other systems within the network 140 (e.g., similar to interface 202), collect data (e.g., similar to the data collector 204), detect anomaly from voltage waveform data (e.g., similar to the anomaly detector 206), generate spectrogram data (e.g., similar to the spectrogram generator 208), manage one or more models (e.g., similar to the model manager 210), etc. In some configurations, the metering system 201 may delegate certain features or functionalities to be performed by the data processing system 150.

The data processing system 150 can receive a portion of the voltage waveform data including the anomaly from the metering system 201. The data processing system 150 can generate spectrogram data from the portion of the voltage waveform data. In some cases, the data processing system 150 can receive the spectrogram data including the anomaly from the metering system 201. In this case, the anomaly classifier 236 can perform features or functionalities similar to the anomaly classifier 212. For example, the anomaly classifier 236 can use the spectrogram data including the anomaly as input to a model executing on the data processing system 150. The model may be trained by the data processing system 150 and downloaded to the metering systems. In some cases, the model may be trained by one or more metering systems and uploaded to the data processing system 150. The anomaly classifier 236 can receive an output from the model indicating one or more types of anomalies according to the features, patterns, signatures, or characteristics of the spectrogram data (or the voltage waveform data). In some cases, the output from the model can include other information related to the anomaly, such as the magnitude, duration, or start time of the anomaly. The anomaly classifier 236 can be configured to classify anomalies detected by other metering systems.

The data processing system 150 can receive the indication of the type(s) of anomalies classified by the anomaly classifier 236. In this case, the data processing system 150 can generate the anomaly signature including the classified anomaly and other relevant features of the anomaly. In some cases, the data processing system 150 may receive the signature identifier from the metering system 201 indicative of the anomaly signature. Subsequently, the action predictor 238 can identify the anomaly signature according to the signature identifier.

The action predictor 238 can perform features or functionalities similar to the action predictor 216 to predict, determine, or select at least one action. For example, responsive to receiving the signature identifier, the action predictor 238 can correlate a grid event with the signature identifier or the anomaly signature based on a log of historical grid events and signature identifiers. Correlating the grid event can include the action predictor 238 correlating the signature identifier or the anomaly signature to the historical signature identifier or historical anomaly signature associated with at least one historical grid event. In such cases, the historical grid event can indicate a potential grid event of the utility grid 100. As such, the action predictor 238 can correlate the grid event to the historical grid event according to the comparable historical signature identifier.

The historical grid event can be associated with at least one historical action performed over the utility grid 100 or at the location of the load. In some cases, the historical action can include the type of notification to provide to the device of the administrator or operator of the utility grid 100. According to the associated historical action, the action predictor 238 can select the action responsive to the correlated grid event. The data processing system 150 can execute or perform the action selected by the action predictor 238, such as similar to the grid controller 218.

The data repository 240 can include, store, or maintain data for the data processing system 150. The data repository 240 can include various data storage configured to store the information discussed herein. In some cases, the data repository 240 can be configured to store data similar to the data repository 220. For instance, the data repository 240 can include similar data storage as the data repository 220. The data repository 240 can include at least a global anomaly log storage 242, a global signature identifier (SID) library storage 244, and an action storage 246, among other data storages. In some cases, the storage of the data repository 240 can be a single storage component or multiple storage components.

The global anomaly log storage 242 can include, store, or maintain historical anomalies detected or classified by the metering systems. The global anomaly log storage 242 can store information related to the historical anomalies from the metering systems. For example, the global anomaly log storage 242 can store the type of anomaly, historical signature identifier, the historical voltage waveform data including the anomaly, the historical spectrogram data including the anomaly, the start time, frequency, duration, magnitude, intensity/strength, or other information associated with the historical anomalies. In some cases, the global anomaly log storage 242 can store information related to each metering system that detected the anomaly, such as the meter ID, location, altitude, connected upstream component (e.g., secondary transformer, distribution point, or other equipment), brand or version of each metering system, etc. The global anomaly log storage 242 can be accessed by the one or more metering systems to retrieve historical data. The historical data may be used in training the model or executing the model to determine the type of anomaly detected by individual metering systems.

The global SID library storage 244 can include, store, or maintain signature identifiers identifying respective anomaly signatures. The signature identifiers can include respective indications of at least one of the type of anomaly, the magnitude of the anomaly, or the duration of the anomaly. In some cases, the global SID library storage 244 can store the context associated with the anomaly signature. The context can include the weather relative (e.g., at or around) the start time of the anomaly, the location of the metering device 118 (e.g., or one of the metering systems) measuring the voltage waveform data, the utility event logs, etc. The context may be used by the data processing system 150 (or the metering systems) as part of the anomaly signature for correlation to the grid event, for example.

The global SID library storage 244 may store signature identifiers that are known (e.g., predefined signature identifiers). The global SID library storage 244 can store signature identifiers considered to be new, such as those with anomaly signatures not previously stored in the global SID library storage 244 or the global anomaly log storage 242. The global SID library storage 244 can store the signature identifiers that are known as noise from electrical distribution over the utility grid 100 (e.g., anomalies that can be ignored). The global SID library storage 244 can store the signature identifiers that are considered to be relatively urgent (e.g., anomalies representing a potential equipment failure, power outage, or other disruption within the utility grid 100). The global SID library storage 244 can be accessed by one or more components of the data processing system 150 to compare the signature identifiers generated by the data processing system 150 or the metering system 201 with the predefined signature identifiers to select at least one action to perform on the utility grid 100.

In some cases, the global SID library storage 244 can store additional signature identifiers generated by the one or more metering systems. The additional signature identifier can be from the metering systems or generated by the one or more components of the data processing system 150. For example, responsive to the metering system 201 generating the anomaly signature and the signature identifier, the data processing system 150 can receive the signature identifier (or the anomaly signature) from the metering system 201. The data processing system 150 can gather the context for the anomaly signature of the signature identifier. The data processing system 150 can store the signature identifier and the associated context in the global SID library storage 244. In cases where the action is not selected by the metering system 201 (e.g., anomaly signature not classified to an action), the data processing system 150 (e.g., action predictor 238) can correlate the signature identifier (or the anomaly signature) and the context associated with the signature to the log of the signature identifiers associated with historical grid events. Based on the correlation, the data processing system 150 can select a predefined action for the utility grid 100 or the metering system 201 using the signature identifier.

The action storage 246 can include, store, or maintain one or more actions executable by one or more metering systems or the data processing system 150. The action can be configurable by the administrator or operator of the utility grid 100, such as via the device of the operator. The action storage 246 may include similar types of content as the action storage 234. In some cases, the action storage 246 can receive new or updated actions capable of being performed by the data processing system 150 or the metering systems. In such cases, the content of the action storage 246 can be synced or downloaded to the metering systems, thereby updating the action storage 234. In some cases, at least one action may be removed from the action storage 246. In such cases, the data processing system 150 can transmit a command to the metering systems to remove the at least one action from the action storages of respective metering systems, enabling the synchronization between local and remote data repositories.

Figure 3:
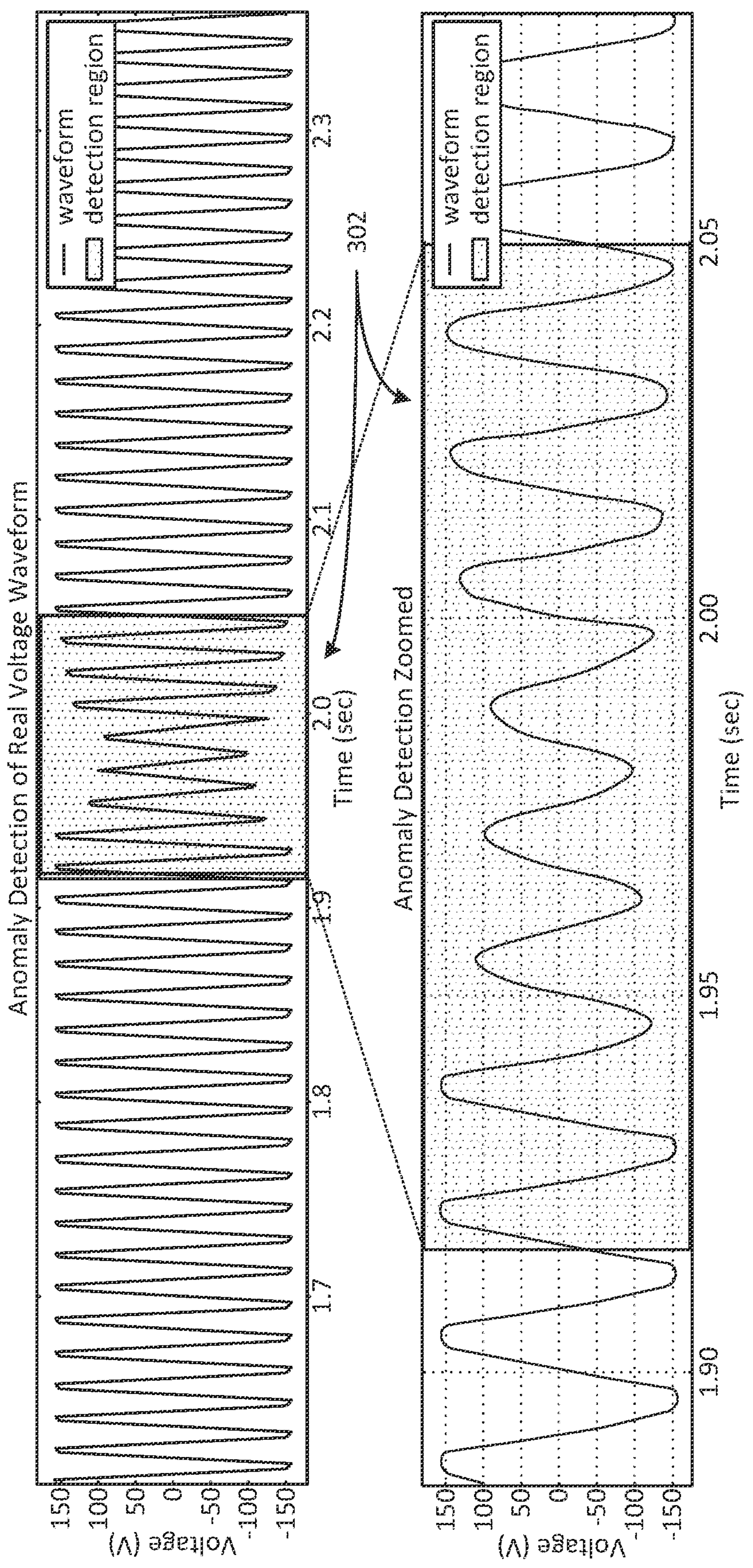
FIG. 3 is a graph illustrating an anomaly detection on voltage waveform data, in accordance with an implementation.

Referring to FIG. 3, depicted is a graph 300 illustrating an anomaly detection on voltage waveform data. The graph 300 can include an example voltage waveform snippet including voltage waveform data with an anomaly. As shown, an anomaly may be detected by the metering system 201 (or other metering systems) in region 302 of the voltage waveform data. The region 302 can represent a window (e.g., a moving window) for analyzing portions of the measured voltage waveform data. For example, the metering system 201 (e.g., anomaly detector 206) can determine or receive metrics (e.g., values) associated with the region 302 or other portions of the voltage waveform data. Based on the metric, such as the average measurement, the metering system 201 can detect that the magnitudes of the waveform (or values) at region 302 (or a portion of the region 302) are relatively low compared to other portions of the waveform (e.g., portions before or after the region 302).

In this case, the minimum peak-to-peak voltage at region 302 may be around 100 volts to −100 volts. In other portions of the waveform, the peak-to-peak voltage may be around 150 volts to −150 volts. As such, the metering system 201 can detect that region 302 (or window) includes the anomaly. Although the example uses the peak-to-peak voltage to detect the anomaly, other types of metrics can be used, such as the average voltage measured during the time window, the peak of the voltage waveform data, etc. The duration of the window can be adjustable. The graph 300 can include a window of between 0.1 to 0.2 seconds. The window size can be configurable by the utility operator. The metering system 201 may use the values from one or more windows prior to region 302 as baseline values to detect the anomaly. For example, the metering system 201 can detect the anomaly by comparing the baseline values (e.g., from a previous window) to subsequent data (e.g., in the region 302). Upon detecting the anomaly, the metering system 201 can flag the region 302 of the voltage waveform data to be converted to a spectrogram or classified.

Figure 4:
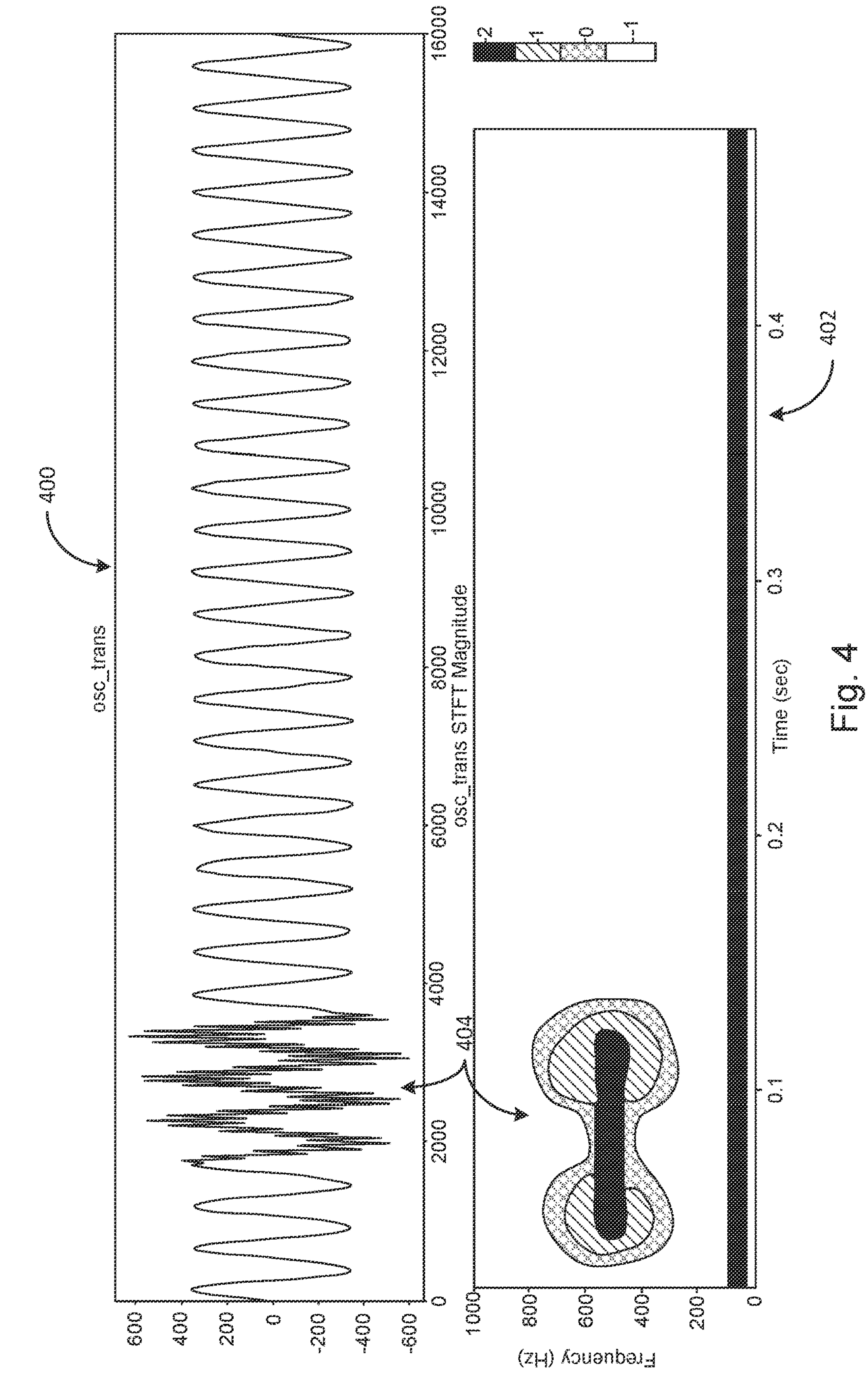
FIG. 4 is a graph and spectrogram of a waveform including an oscillatory transient anomaly, in accordance with an implementation.

Referring to FIG. 4, depicted is a graph 400 and spectrogram 402 of a waveform including an oscillatory transient anomaly. The graph 400 can include a snippet of the voltage waveform data (e.g., portions of the voltage waveform data measured by the metering system 201 or other metering systems). The voltage waveform data can include an anomaly detected by the metering system 201. For example, at portion 404, the metering system 201 (e.g., anomaly detector 206) can detect an anomaly in the voltage waveform data. Responsive to detecting the anomaly, the metering system 201 can convert the voltage waveform data to spectrogram data, as shown in the spectrogram 402.

The spectrogram 402 can represent a Fourier transformation of the voltage waveform data of graph 400. The spectrogram 402 can include the spectrogram data including the anomaly at portion 404. The metering system 201 (e.g., spectrogram generator 208) can convert the portion of the voltage waveform data with the anomaly to the spectrogram data, although other portions of the voltage waveform data may be converted with the portion including the anomaly.

From the spectrogram 402, the metering system 201 can identify various features or signatures associated with the spectrogram 402, such as the frequency (e.g., may correspond to the magnitude of the anomaly in the spectrogram 402) of the anomaly, the duration of the anomaly, the signal strength of the portion of the voltage waveform data, etc. As shown, at the relatively normal portions of the voltage waveform (e.g., portions without anomaly), the metering system 201 can detect a frequency of the voltage waveform at around 50 Hz using the spectrogram 402. At portion 404 including the anomaly, the metering system 201 may detect a frequency of around 500 Hz using the spectrogram 402. The metering system 201 can use the spectrogram 402, including the various detected characteristics or features, as input into the model for classifying the anomaly. In this case, based on the features or characteristics of the anomaly from the spectrogram 402 (or the graph 400), the metering system 201 (e.g., anomaly classifier 212) may determine that the anomaly is an oscillatory transient anomaly. Other types of anomaly may present different characteristics in the voltage waveform or the spectrogram 402, for example.

Figure 5:
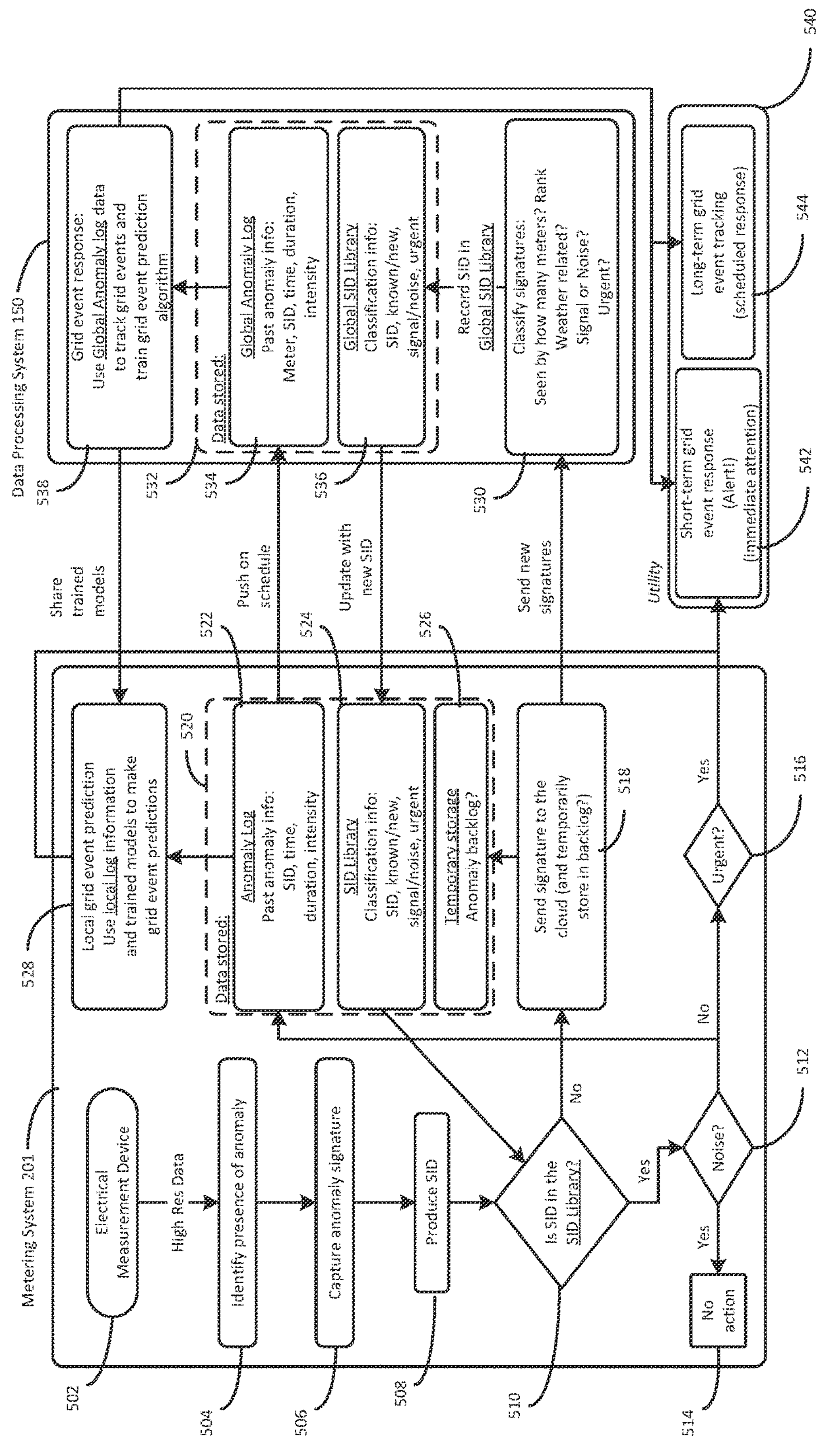
FIG. 5 is a flow diagram of an example method for anomaly detection, classification, or prediction, in accordance with an implementation.

Referring to FIG. 5, depicted is a flow diagram of an example method 500 for anomaly detection, classification, or prediction. The example method 500 can be executed, performed, or otherwise carried out by one or more components of the utility grid 100 (e.g., computing device, metering devices 118, data processing system 150, etc.), the system 200 (e.g., data processing system 150, metering system 201, etc.), or computing device 700, etc. Although the steps of the method 500 are shown to be performed by one of the metering system 201 or the data processing system 150, certain steps discussed herein can be performed by either one of the metering system 201 or the data processing system 150.

In various configurations, the metering system 201 can include at least one electrical measurement device 502. The electrical measurement device 502 can include one or more sensors configured to measure the electricity from the utility grid 100 at the location of the metering system 201. The electrical measurement device 502 can be configured to capture relatively high-resolution data, such as above 1 kHz data or above 10 kHz data. The electrical measurement device 502 can measure the electricity distributed over the utility grid 100 to generate the voltage waveform data.

At ACT 504, the metering system 201 (e.g., anomaly detector 206) can identify or detect the presence of an anomaly based on the voltage waveform data. The metering system 201 can detect the anomaly based on statistical metrics computed for individual windows of the voltage waveform data using at least one statistical technique. For example, for each batch of the voltage waveform data measured by the electrical measurement device 502 (e.g., measurements within a time interval), the metering system 201 can compute a set of metrics characterizing the batch of voltage waveform data. The metering system 201 can be configured with a training period or an initialization period to determine the baseline values (e.g., baseline metric values) indicating relatively normal voltage waveform data. Although the initial baseline values can be determined during the training period, the metering system 201 can continuously update the baseline values with new data (e.g., new metrics) computed using additional voltage waveform data measured by the electrical measurement device 502.

The metering system 201 can compare the baseline values to subsequent statistical metrics (e.g., metric values), such as the baseline values from a first window of the voltage waveform data and the subsequent metrics from a second window of the voltage waveform data. The metering system 201 can determine whether the difference between the baseline values and the subsequent metrics is greater than (or equal to) a predetermined threshold. The predetermined threshold can include a percentage difference, an integer, or a ratio of the difference. If the difference is at or above the threshold, the metering system 201 can flag the window (e.g., the second window or the portion) of voltage waveform data to have an anomaly. If the difference is below the threshold, the metering system 201 can determine that the window of voltage waveform data does not have the anomaly. In some cases, the metering system 201 can update the baseline values with portions of the voltage waveform data considered not to have the anomaly. By updating the baseline values, the baseline can be changed to accommodate for changes in the voltage waveform behavior that occur over a relatively long time period compared to the anomaly being searched.

At ACT 506, the metering system 201 (e.g., signature generator 214) can capture the anomaly signature for the anomaly. For example, the metering system 201 (e.g., spectrogram generator 208) can generate the spectrogram data based on at least the portion of the voltage waveform data including the anomaly. The metering system 201 (e.g., anomaly classifier 212) can execute the model using the spectrogram data as input to classify the spectrogram data as including at least one type of anomaly. The metering system 201 can determine other information related to the anomaly, such as the duration, the magnitude, the intensity, etc. The metering system 201 can generate the anomaly signature to include the type of anomaly and other related information based on a predetermined format for anomaly signatures. The predefined format for the anomaly signatures can be configured by the administrator indicating the types of information (or minimum types of information) to be included as part of individual anomaly signatures.

At ACT 508, the metering system 201 can produce or generate a signature identifier (SID) based on the anomaly signature. The signature identifier can include indications of (e.g., formatted to indicate) the content of the anomaly signature, such as one or more types of anomaly, duration, magnitude, intensity, frequency, or start time of the anomaly, among others. In some cases, the duration, magnitude (e.g., intensity), or frequency of the anomaly may be rounded. For example, the duration of the anomaly can be the exact duration detected or rounded to the nearest tenth of a second. The magnitude may be rounded to the nearest whole intensity value of −1, 0, 1, 2, etc. The frequency can be rounded to the nearest whole number, etc. The signature identifier can be used by the metering system 201, other metering systems, or the data processing system 150 to identify the anomaly signature. The start time of the anomaly may be used to compare the anomaly with potential other anomalies detected by other metering systems with a similar anomaly start time, for example.

At ACT 510, the metering system 201 can determine whether there is an existing signature identifier in a SID library storage 524 corresponding to the generated signature identifier. For example, the metering system 201 can include a data repository 520 (e.g., similar to the data repository 220). The data repository 520 can include an anomaly log storage 522, a SID library storage 524, and a temporary storage 526. The anomaly log storage 522 can include, store, or maintain historical anomaly information, such as the signature identifier, (start) time of the anomaly, duration of the anomaly, and intensity (e.g., magnitude) of the anomaly, among others. The SID library storage 524 can include, store, or maintain classification information of the anomaly signature, such as the signature identifier associated with the anomaly signature, anomaly signatures that are known or new (e.g., downloaded from the data processing system 150), known noise signature, signatures or characteristics of anomalies considered as urgent, among other information. An urgent type of anomaly can include or refer to anomalies that may be an indicator or predictor of a fault or an outage likely to occur in the utility grid within a predetermined time threshold, such as within 10 minutes, 15 minutes, 30 minutes, or 1 hour. The temporary storage 526 can include, store, or maintain a backlog of the anomaly signature captured by the metering system 201. The data repository 520 can include or store other information similar to at least one of the data repository 220 or data repository 240.

The data repository 520 can include similar information as the data repository 532 (e.g., external data repository) of the data processing system 150. The data repository 520 may include additional or alternative information from the data repository 532. In some cases, certain information from the data repository 520 can be synced with the data repository 532. For example, the metering system 201 can push or upload additional information stored in the anomaly log storage 522 to the data repository 532 (e.g., upload to the global anomaly log storage 534). The metering system 201 can upload the information to the data processing system 150 periodically or on a schedule, such as hourly, daily, weekly, etc. The metering system 201 may receive or download new or updated signature identifiers from the data processing system 150 (e.g., from global SID library storage 536) for storage in the SID library storage 524. The metering system 201 can download new or updated signature identifiers in response to receiving an indication of new signature identifier(s) from the data processing system 150. In some cases, the metering system 201 can receive new signature identifiers broadcasted by the data processing system 150 to one or more metering systems. As discussed herein, the data repository 532 of the data processing system 150 may correspond to or include data of the data repository 240. For example, the global anomaly log storage 534 can include information similar to the global anomaly log storage 242, or the global SID library storage 536 can include information similar to the global SID library storage 244.

The metering system 201 can perform a look-up in the data repository 520 to determine whether the signature identifier is in the SID library storage 524. If the signature identifier is not stored in the SID library storage 524, the metering system 201 can proceed to ACT 518. Otherwise, if the signature identifier matches a known signature identifier (or a new signature identifier downloaded from the data processing system 150), the metering system 201 can proceed to ACT 512.

At ACT 512, the metering system 201 can determine whether the signature identifier corresponds to or indicates a noise in the voltage waveform data. If the anomaly signature indicates the noise, at ACT 514, the metering system 201 may ignore the detected anomaly (e.g., take no action). Otherwise, if the anomaly signature is not noise, the metering system can store the information related to the anomaly in the anomaly log storage 522 local to the metering system 201. Subsequently, the metering system 201 can proceed to ACT 528.

At ACT 528, the metering system 201 can perform local grid event prediction using the local log information (e.g., from the anomaly log storage 522) and the trained model to correlate a historical anomaly signature to the current anomaly signature. By correlating the signatures, the metering system 201 can predict or determine at least one grid event likely to occur within the utility grid 100. In some cases, the grid event may be indicative of an urgent grid event. In some other cases, the grid event may be indicative of a relatively non-urgent grid event. As such, the metering system 201 can proceed to ACT 516.

At ACT 516, the metering system 201 can determine whether the signature identifier or anomaly signature indicates an urgent event within the utility grid 100. In some cases, ACT 516 may be performed concurrently to ACT 528. Depending on whether the grid event is urgent, the metering system 201 can perform at least one of multiple actions 540 on the utility grid 100. For example, the action 540 can include at least a short-term grid event response (e.g., ACT 542) and a long-term grid event response (e.g., ACT 544). If the grid event is relatively urgent, at ACT 542, the metering system 201 can perform the short-term grid event response, such as sending an alert (e.g., immediate attention) to the data processing system 150 (or operator device). The alert can indicate the predicted grid event and at least one action selected to be performed responsive to the grid event.

If the grid event is relatively non-urgent, at ACT 544, the metering system 201 can signal the data processing system 150 to perform long-term grid event tracking. In this case, the data processing system 150 can be configured to continue monitoring or tracking the characteristics of electricity distributed over the utility grid 100 to the one or more metering systems detecting the anomaly. The data processing system 150 can be configured to track information related to the predicted grid event. The metering system 201, among other metering systems, can schedule to upload information from the anomaly log storage 522 to the data processing system 150 for long-term grid event tracking.

The metering system 201 can proceed to ACT 518 responsive to the signature identifier not identified within the data repository 520 (e.g., SID library storage 524). At ACT 518, the metering system 201 can send the signature identifier (or the anomaly signature) to the data processing system 150. Prior to sending the signature identifier, the metering system 201 can store the signature identifier or the anomaly signature associated with the signature identifier in the temporary storage 526. The data processing system 150 can receive the signature identifier or the anomaly signature from the metering system 201, which in some cases, indicates that the signature identifier is new.

At ACT 530, the data processing system 150 can perform a classification on the signature identifier indicating the anomaly signature. For example, the data processing system 150 can identify the number of metering systems detecting the anomaly at around the same time as the metering system 201 to determine whether the anomaly originated on the utility grid 100. The data processing system 150 can gather the weather information around the time of the anomaly to determine whether the anomaly is weather related. The data processing system 150 can determine whether the anomaly represents a signal (e.g., relevant information to the health of the equipment of the utility grid or on the load side) or noise, such as from produced by the sensor of the metering system 201, interference during data transmission, etc. The data processing system 150 can determine whether the anomaly is considered relatively urgent or non-urgent. The data processing system 150 can store the various information related to the signature identifier in the global SID library storage 536 as part of a new signature identifier. The data processing system 150 can update the SID library storage 524 local to the metering system 201 with the new signature identifier.

At ACT 538, the data processing system 150 can be configured to share trained models with the metering system 201. For example, the data processing system 150 can use data stored in the global anomaly log storage 534 to track grid events including anomalies detected by one or more metering systems, anomaly signatures associated with the anomalies, and the grid events related to the anomaly signatures. The data processing system 150 can use the tracking information to train the model including the grid event prediction algorithm. Accordingly, the data processing system 150 can be configured to train and execute the model for predicting grid events or selecting at least one action to perform responsive to the predicted grid event. The data processing system 150 can broadcast the trained model to one or more metering devices. Similarly to the metering system 201, if the data processing system 150 performs the prediction of the grid event, the data processing system 150 can proceed to one of ACT 542 or ACT 544 according to the selected action.

Figure 6:
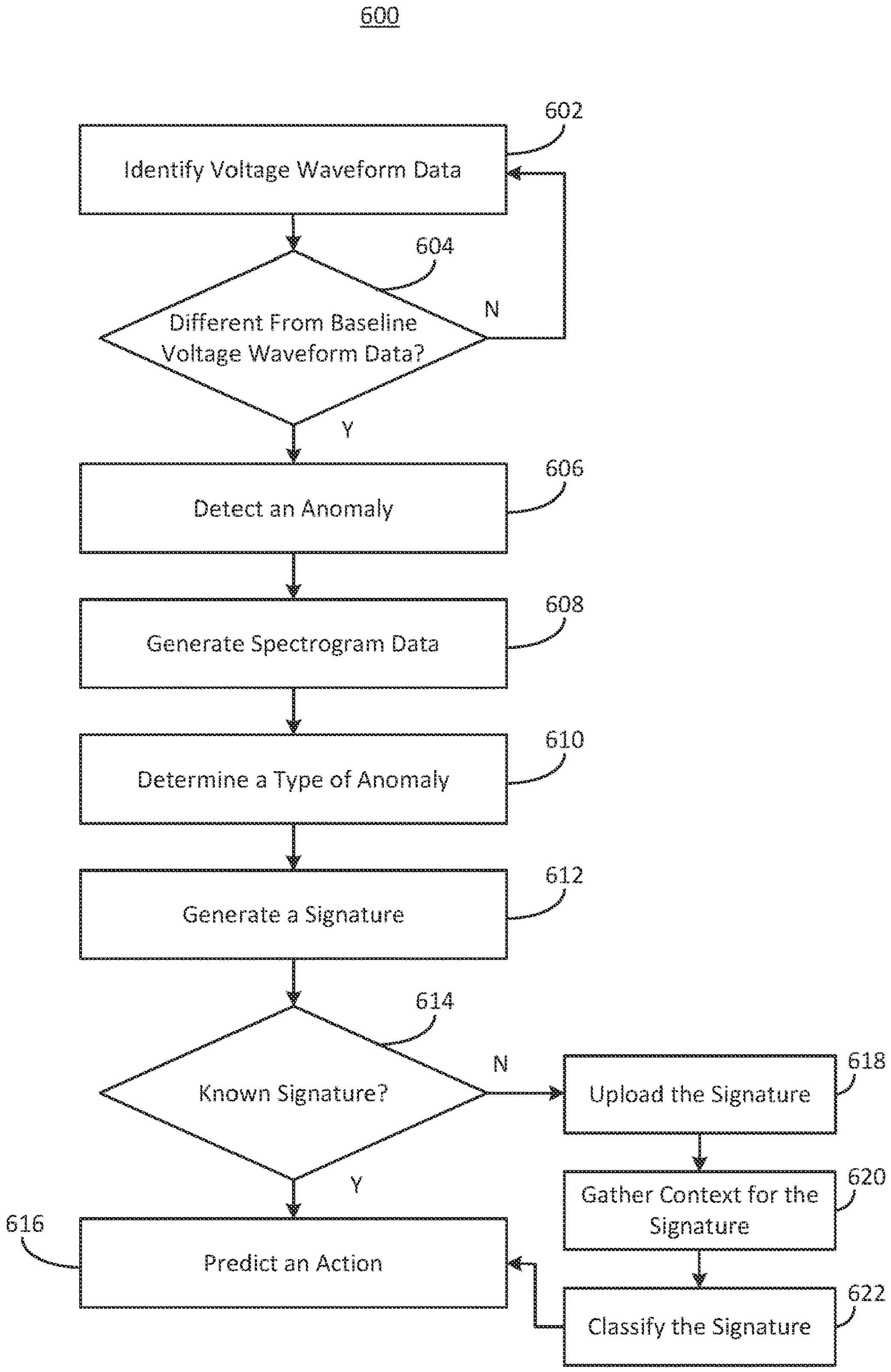
FIG. 6 is a flow diagram of an example method for detecting, classifying, or predicting anomalies, in accordance with an implementation.

Referring to FIG. 6, an example flow diagram of a method 600 for detecting, classifying, or predicting anomalies. The example method 600 can be executed, performed, or otherwise carried out by one or more components of the utility grid 100 (e.g., computing device, metering devices 118, data processing system 150, etc.), the system 200 (e.g., data processing system 150, metering system 201, etc.), or computing device 700, etc. Although the metering system is described herein to execute or perform the method 600, other metering systems or the data processing system can perform similar features or functionalities as the metering system to perform the method 600. The method 600 can include identifying voltage waveform data, at ACT 602. At ACT 604, the method 600 can include determining whether the voltage waveform data is different from the baseline voltage waveform data. At ACT 606, the method 600 can include detecting an anomaly. At ACT 608, the method 600 can include generating spectrogram data. At ACT 610, the method 600 can include determining a type of anomaly. At ACT 612, the method 600 can include generating a signature (e.g., anomaly signature). At ACT 614, the method 600 can include determining whether the signature is known. At ACT 616, the method 600 can include predicting an action. At ACT 618, the method 600 can include uploading the signature. At ACT 620, the method 600 can include gathering context for the signature. At ACT 622, the method 600 can include classifying the signature.

Still referring to FIG. 6 in further detail, at ACT 602, a metering system (e.g., metering device or data processing system) can identify voltage waveform data corresponding to electricity distributed over a utility grid. In some cases, the metering system can correspond to or include a metering device configured to measure the electricity distributed over the utility grid to generate the voltage waveform data. In some other cases, the metering system can be a computing device (e.g., data processing system or other computing devices) configured to receive the voltage waveform data from the metering device. In this case, the metering system can communicate with the metering device configured to measure the electricity distributed over the utility grid and generate the voltage waveform data.

At ACT 604, the metering system can determine whether the voltage waveform data is different from the baseline voltage waveform data. The metering system can obtain the baseline voltage waveform data during a training period (e.g., an initial time window) when measuring the electricity over the utility grid. The baseline voltage waveform data can represent normal (or expected) voltage waveform data without any type of anomaly. The voltage waveform data or the baseline voltage waveform data can include respective one or more metrics (e.g., values) indicating the characteristics or features (e.g., a part of the electrical signature) of the electricity over individual time windows. The one or more metrics can be computed or determined using at least one statistical technique.

After determining the baseline voltage waveform data, the metering system can compare the baseline voltage waveform data (or baseline metric(s)) to the voltage waveform data (e.g., subsequent metrics) in later time windows. For example, the metering system can receive the voltage waveform data including one or more metrics of the electricity over a first time window and a second time window. The metering system can determine the baseline voltage waveform data based on the first values of the one or more metrics in the first time window. After measuring the voltage waveform data in the second time window (or other subsequent time windows), the metering system can determine the second values of the one or more metrics in the second time window. Accordingly, the metering system can compare the second values associated with the voltage waveform data to the first values associated with the baseline voltage waveform data. If the values of the voltage waveform data are different from the values of the baseline voltage waveform data, such as having a delta or difference greater than a predetermined threshold, the metering system can proceed to ACT 606. Otherwise, the metering system may continue to identify other voltage waveform data, at ACT 602.

At ACT 606, the metering system can detect an anomaly in at least a portion of the voltage waveform data based on the comparison between the voltage waveform data and the baseline voltage waveform data. Referring to the above example, the metering system may determine a difference between the voltage waveform data and the baseline voltage waveform data (e.g., the difference between the first values and the second values greater than the threshold). Based on the comparison between the second values and the first values, the metering system can detect that there is at least one anomaly in at least the portion of the voltage waveform data in the second time window. The portion of the voltage waveform data may refer to the second time window or a portion of the second time window including values that differ from the values of the metrics of the baseline voltage waveform data.

At ACT 608, the metering system can generate spectrogram data for at least the portion of the voltage waveform data including the anomaly. In some cases, the metering system may generate additional spectrogram data in other portions of the voltage waveform data, such as a predetermined duration before or after the portion of the voltage waveform data including the anomaly. In some other cases, the metering system may not generate the spectrogram data for other portions that do not include an indication of the anomaly (or other anomalies).

At ACT 610, the metering system can determine a type of anomaly based on the generated spectrogram data. The metering system can use a model trained with one or more machine learning techniques to perform the determination, using the spectrogram data as input. The model can process the spectrogram data by correlating the characteristics of the anomaly in the spectrogram data to historical data including historical spectrogram data associated with at least one predetermined type of anomaly. The characteristics of the spectrogram can include at least one of the frequencies of the signals, the intensity or magnitude of the signals at the respective frequencies, the duration (e.g., of the portion including the anomaly), etc. The characteristics presented in the spectrogram data can be indicators of at least one type of anomaly (or indicators of a signal noise). The type of anomaly can correspond to at least one of sag, swell, interruption, flicker, oscillatory transient, harmonics, or notch, among others. Responsive to processing the spectrogram data, the metering system, using the trained model, can determine the type of anomaly included in the portion of the voltage waveform data.

In some configurations, the metering system can determine whether the anomaly originated from the utility grid or caused by the load at the location of the metering system (or metering device). For example, the metering system can identify or receive second voltage waveform data corresponding to the electricity distributed over the utility grid and measured by a second metering device (e.g., second metering system) different from the metering device. The second metering device may be located relatively near to the metering device or coupled to the same upstream grid equipment (e.g., secondary transformer or distribution point). The second voltage waveform data from the second metering device can be measured at a similar time interval as the voltage waveform data from the metering device.

In some cases, the metering system can determine whether there is an anomaly at least a portion of the second voltage waveform data. The portion of the second voltage waveform data may be similar to the portion of the voltage waveform data including the anomaly. If there is an anomaly (e.g., second anomaly) in the portion of the second voltage waveform data, the metering system can determine whether the type of the second anomaly in the second voltage waveform data corresponds to the type of the anomaly in the voltage waveform data via the classification of second spectrogram data generated for at least the portion of the second voltage waveform data. If the type of the second anomaly in the second voltage waveform data corresponds to the type of the anomaly in the voltage waveform data, the metering system can verify that the anomaly (or the type of anomaly) originated on the utility grid responsive to the classification of the second anomaly.

In some other cases, the metering system may determine that the type of the second anomaly is different from the type of the anomaly in the voltage waveform data responsive to the classification of the second anomaly or that there is no anomaly at the portion of the second voltage waveform data, where the portion of the second voltage waveform data includes similar start time as the portion of the voltage waveform data including the anomaly. In response to the determination, the metering system can determine a likelihood that the cause of the anomaly is a load at the location of the metering device that measured the voltage waveform data. The origin of the anomaly detected by the metering system can be used, in part, to generate the anomaly signature.

At ACT 612, the metering system can generate a signature (e.g., anomaly signature) or a signature identifier indicating or identifying the anomaly signature. For example, the metering system can determine the duration of the anomaly based on the at least the portion of the voltage waveform data including the anomaly. The metering system can determine the magnitude or intensity of the anomaly based on the spectrogram data. The metering system may determine other features or signatures associated with the anomaly. Responsive to determining or identifying these signatures of the anomaly, the metering system can generate a signature identifier for the anomaly, such as based on at least one of the type of the anomaly, the duration of the anomaly, or the magnitude of the anomaly, among other anomaly signatures.

At ACT 614, the metering system can determine whether the signature (e.g., signature identifier or anomaly signature) is known. The metering system can identify the known signature, for instance, by performing a look-up in the local data repository (e.g., SID library) or in a remote data repository (e.g., global SID library). If the signature identifier is not stored in the local or remote data repositories, the metering system can determine that the signature is not known (e.g., a new signature). In this case, the metering system can proceed to ACT 618. Otherwise, if the metering system identifies the signature identifier in the data repository, the metering system can determine that the signature is a known signature, and proceed to ACT 616.

At ACT 616, the metering system can predict or select an action to be performed on the utility grid. The action may include, for instance, short-term grid event response (e.g., sending an indication, notification, or alert), long-term grid event tracking (e.g., tracking voltage measurements or anomalies detected by one or more metering devices to schedule a response), etc. The metering system may predict or select the action to be performed responsive to or according to the determination of the type of anomaly.

The metering system can select an action to be performed on the utility grid based on the signature identifier. For example, the data repository (e.g., local or remote data repository) can store various signature identifiers and associated actions to be performed on the utility grid. Responsive to identifying a known signature, the metering system can select the action associated with the known signature identifier (or anomaly signature). In some cases, the metering system can determine that the signature identifier is associated with a known noise signature. In this case, the metering system may ignore the detected anomaly (e.g., perform no action).

In some other cases, the metering system may determine that the signature identifier identifies at least one type of anomaly that may affect the operation of the utility grid (e.g., potentially disrupting the distribution of electricity). In this case, depending on whether the type of anomaly is urgent or not urgent (e.g., an indication of the urgency of the type of anomaly stored in the data repository), the metering system can provide an indication to the data processing system to cause an action to be performed (e.g., send or display an alert to the operator for urgent anomalies or track events within the utility grid for non-urgent anomalies). In some configurations, the metering system may provide the alert or perform event tracking responsive to the determination of the type of anomaly (e.g., including whether urgent or non-urgent).

In some configurations, the data processing system remote from the metering device can select the action to be performed on the utility grid. For example, the metering system may provide the generated signature identifier to the data processing system. The data processing system can receive the signature identifier from the metering system. The data processing system can determine the grid event associated with the signature identifier, for instance, by correlating one or more grid events with the signature identifier based on a log of historical grid events that are associated with various known signature identifiers. Responsive to the correlated grid event, the data processing system can select the action to perform.

At ACT 618, if the signature is not known, the metering system can upload or send the signature (e.g., signature identifier identifying the anomaly signature) to the data processing system. At ACT 620, the data processing system can include gathering context for the signature. The context may include information related to the anomaly (e.g., around the start time of the anomaly), such as the weather condition during the anomaly, the location of the metering device that identified the voltage waveform data, the utility event log, etc.

At ACT 622, the data processing system can classify the signature according to the anomaly signature and the context associated with the anomaly. For example, if the weather condition during the anomaly includes a snowstorm, relatively heavy rain, etc., the data processing system may classify the signature as being caused by a weather condition. In another example, if the utility event log indicates an abnormal condition of at least one utility equipment during the anomaly, the data processing system may classify the signature as being caused by the equipment of the utility grid. In yet another example, the data processing system may classify the signature to indicate the origin of the anomaly (e.g., caused by the load at the metering device location or originating from the utility). In further examples, the data processing system may receive a classification from the administrator or operator of the utility grid according to the provided signature. After classifying the signature, the data processing system can provide the classified signature to the metering system, such that the signature is known to the metering system. In this case, the data processing system may perform the selection of the action (e.g., ACT 616) or send a request to the metering system to select the action.

Figure 7:
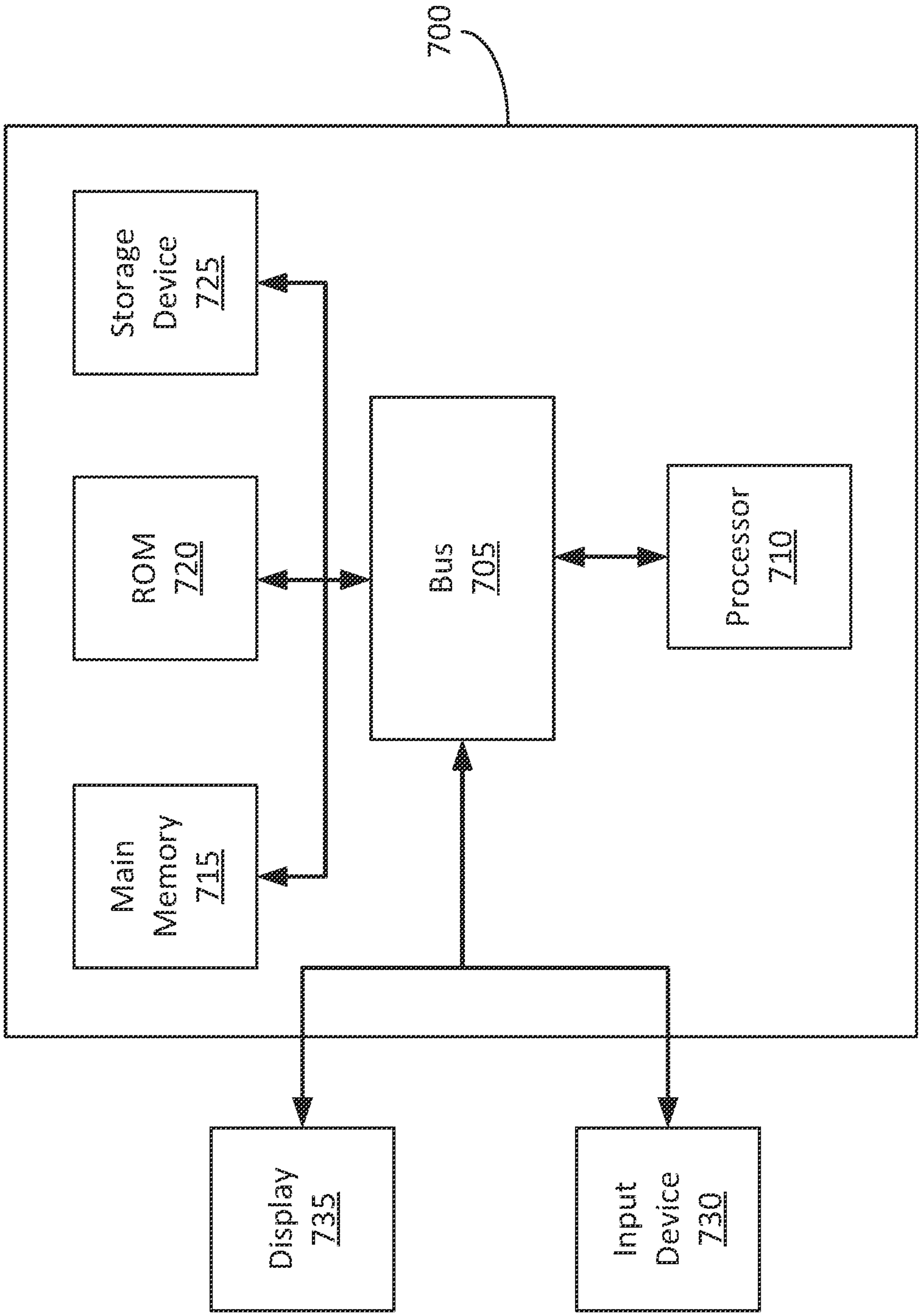
FIG. 7 is a block diagram illustrating an architecture for a computer system that can be employed to implement elements of the systems and methods described and illustrated herein, including, for example, aspects of the utility grid depicted in FIG. 1, the system depicted in FIG. 2, and the operations depicted in FIGS. 5-6.

FIG. 7 is a block diagram of an example computer system 700. The computer system or computing device 700 can include or be used to implement the data processing system 150, the metering system 201, or its components thereof. The computing system 700 includes at least one bus 705 or other communication components for communicating information and at least one processor 710 or processing circuit coupled to the bus 705 for processing information. The computing system 700 can also include one or more processors 710 or processing circuits coupled to the bus for processing information. The computing system 700 also includes at least one main memory 715, such as a random access memory (RAM) or other dynamic storage devices, coupled to the bus 705 for storing information, and instructions to be executed by the processor 710. The main memory 715 can also be used for storing position information, utility grid data, command instructions, device status information, environmental information within or external to the utility grid, information on characteristics of electricity, or other information during execution of instructions by the processor 710. The computing system 700 may further include at least one read only memory (ROM) 720 or other static storage device coupled to the bus 705 for storing static information and instructions for the processor 710. A storage device 725, such as a solid state device, magnetic disk or optical disk, can be coupled to the bus 705 to persistently store information and instructions.

The computing system 700 may be coupled via the bus 705 to a display 735, such as a liquid crystal display, or active matrix display, for displaying information to a user such as an administrator of the data processing system or the utility grid. An input device 730, such as a keyboard or voice interface may be coupled to the bus 705 for communicating information and commands to the processor 710. The input device 730 can include a touch screen display 735. The input device 730 can also include a cursor control, such as a mouse, a trackball, or cursor direction keys, for communicating direction information and command selections to the processor 710 and for controlling cursor movement on the display 735. The display 735 can be part of the data processing system 150, the metering system 201, or other components of at least one of FIGS. 1-2.

The processes, systems and methods described herein can be implemented by the computing system 700 in response to the processor 710 executing an arrangement of instructions contained in main memory 715. Such instructions can be read into main memory 715 from another computer-readable medium, such as the storage device 725. Execution of the arrangement of instructions contained in main memory 715 causes the computing system 700 to perform the illustrative processes described herein. One or more processors in a multi-processing arrangement may also be employed to execute the instructions contained in main memory 715. Hard-wired circuitry can be used in place of or in combination with software instructions together with the systems and methods described herein. Systems and methods described herein are not limited to any specific combination of hardware circuitry and software.

Although an example computing system has been described in FIG. 7, the subject matter including the operations described in this specification can be implemented in other types of digital electronic circuitry, or in computer software, firmware, or hardware, including the structures disclosed in this specification and their structural equivalents, or in combinations of one or more of them.

FURTHER EXAMPLES

The following examples pertain to further embodiments, from which numerous permutations and configurations will be apparent.

Example 1 includes a system, comprising: one or more processors coupled with memory, to: identify voltage waveform data corresponding to electricity distributed over a utility grid and measured by a metering device; detect, based on a comparison with baseline voltage waveform data, an anomaly in at least a portion of the voltage waveform data; generate spectrogram data for the at least the portion of the voltage waveform data comprising the anomaly; determine, via a model trained with machine learning, a type of the anomaly based on the spectrogram data; and provide an indication of the type of the anomaly to cause an action to be performed on the utility grid responsive to determination of the type of anomaly.

Example 2 includes the subject matter of Example 1, comprising: the one or more processors to determine the type of the anomaly corresponds to at least one of sag, swell, interruption, flicker, oscillatory transient, harmonics, or notch.

Example 3 includes the subject matter of any of Examples 1 and 2, comprising the one or more processors to: receive the voltage waveform data comprising one or more metrics of the electricity over a first time window and a second time window; determine the baseline voltage waveform data based on first values of the one or more metrics in the first time window; and detect the anomaly in the at least the portion of the voltage waveform data in the second time window subsequent to the first time window based on a comparison of second values of the one or more metrics in the second time window with the first values.

Example 4 includes the subject matter of any of Examples 1 through 3, comprising: a metering system comprising: the one or more processors coupled with memory; and the metering device to measure the electricity distributed over the utility grid to generate the voltage waveform data.

Example 5 includes the subject matter of any of Examples 1 through 4, comprising: a data processing system comprising the one or more processors coupled with the memory, the data processing system remote from the metering device.

Example 6 includes the subject matter of any of Examples 1 through 5, comprising the one or more processors to: determine a duration of the anomaly based on the at least the portion of the voltage waveform data comprising the anomaly; determine a magnitude of the anomaly; and generate a signature identifier for the anomaly based on the type of the anomaly, the duration of the anomaly, and the magnitude of the anomaly.

Example 7 includes the subject matter of any of Examples 1 through 6, comprising: the one or more processors to select the action to be performed on the utility grid based on the signature identifier.

Example 8 includes the subject matter of any of Examples 1 through 7, comprising: a data processing system remote from the metering device to: receive the signature identifier; correlate a grid event with the signature identifier based on a log of historical grid events and signature identifiers; and select the action responsive to the correlated grid event Example 9 includes the subject matter of any of Examples 1 through 8, comprising the one or more processors to: identify second voltage waveform data corresponding to the electricity distributed over the utility grid and measured by a second metering device different from the metering device; determine that a second anomaly in at least a portion of the second voltage waveform data corresponds to the type of the anomaly in the voltage waveform data via classification of second spectrogram data generated for the at least the portion of the second voltage waveform data; and verify the type of the anomaly originated on the utility grid responsive to the classification of the second anomaly.

Example 10 includes the subject matter of any of Examples 1 through 9, comprising the one or more processors to: identify second voltage waveform data corresponding to the electricity distributed over the utility grid and measured by a second metering device different from the metering device; determine that a second anomaly in at least a portion of the second voltage waveform data corresponds to a second type via classification of second spectrogram data generated for the at least the portion of the second voltage waveform data; and determine, responsive to the type of the anomaly being different from the second type of the second anomaly, a likelihood that a cause of the anomaly is a load at a location of the metering device that measured the voltage waveform data.

Example 11 includes a method, comprising: identifying, by one or more processors coupled with memory, voltage waveform data corresponding to electricity distributed over a utility grid and measured by a metering device; detecting, by the one or more processors, based on a comparison with baseline voltage waveform data, an anomaly in at least a portion of the voltage waveform data; generating, by the one or more processors, spectrogram data for the at least the portion of the voltage waveform data comprising the anomaly; determining, by the one or more processors via a model trained with machine learning, a type of the anomaly based on the spectrogram data; and providing, by the one or more processors, an indication of the type of the anomaly to cause an action to be performed on the utility grid responsive to determination of the type of anomaly.

Example 12 includes the subject matter of Example 11, comprising: determining, by the one or more processors, the type of the anomaly corresponds to at least one of sag, swell, interruption, flicker, oscillatory transient, harmonics, or notch.

Example 13 includes the subject matter of Examples 11 and 12, comprising: receiving, by the one or more processors, the voltage waveform data comprising one or more metrics of the electricity over a first time window and a second time window; determining, by the one or more processors, the baseline voltage waveform data based on first values of the one or more metrics in the first time window; and detecting, by the one or more processors, the anomaly in the at least the portion of the voltage waveform data in the second time window subsequent to the first time window based on a comparison of second values of the one or more metrics in the second time window with the first values.

Example 14 includes the subject matter of Examples 11 through 13, comprising: determining, by the one or more processors, a duration of the anomaly based on the at least the portion of the voltage waveform data comprising the anomaly; determining, by the one or more processors, a magnitude of the anomaly; and generating, by the one or more processors, a signature identifier for the anomaly based on the type of the anomaly, the duration of the anomaly, and the magnitude of the anomaly.

Example 15 includes the subject matter of Examples 11 through 14, comprising: selecting, by the one or more processors, the action to be performed on the utility grid based on the signature identifier.

Example 16 includes the subject matter of Examples 11 through 15, comprising: receiving, by a data processing system remote from the metering device, the signature identifier; correlating, by the data processing system, a grid event with the signature identifier based on a log of historical grid events and signature identifiers; and selecting, by the data processing system, the action responsive to the correlated grid event.

Example 17 includes the subject matter of Examples 11 through 16, comprising: identifying, by the one or more processors, second voltage waveform data corresponding to the electricity distributed over the utility grid and measured by a second metering device different from the metering device; determining, by the one or more processors, that a second anomaly in at least a portion of the second voltage waveform data corresponds to the type of the anomaly in the voltage waveform data via classification of second spectrogram data generated for the at least the portion of the second voltage waveform data; and verifying, by the one or more processors, the type of the anomaly originated on the utility grid responsive to the classification of the second anomaly.

Example 18 includes the subject matter of Examples 11 through 17, comprising: identifying, by the one or more processors, second voltage waveform data corresponding to the electricity distributed over the utility grid and measured by a second metering device different from the metering device; determining, by the one or more processors, that a second anomaly in at least a portion of the second voltage waveform data corresponds to a second type via classification of second spectrogram data generated for the at least the portion of the second voltage waveform data; and determining, by the one or more processors, responsive to the type of the anomaly being different from the second type of the second anomaly, a likelihood that a cause of the anomaly is a load at a location of the metering device that measured the voltage waveform data.

Example 19 includes a non-transitory computer readable storage medium storing processor executable instructions that, when executed by one or more processors, cause the one or more processors to: identify voltage waveform data corresponding to electricity distributed over a utility grid and measured by a metering device; detect, based on a comparison with baseline voltage waveform data, an anomaly in at least a portion of the voltage waveform data; generate spectrogram data for the at least the portion of the voltage waveform data comprising the anomaly; determine, via a model trained with machine learning, a type of the anomaly based on the spectrogram data; and provide an indication of the type of the anomaly to cause an action to be performed on the utility grid responsive to determination of the type of anomaly.

Example 20 includes the subject matter of Example 19, wherein the instructions further comprise instructions to: determine the type of the anomaly corresponds to at least one of sag, swell, interruption, flicker, oscillatory transient, harmonics, or notch.

Some of the descriptions herein emphasize the structural independence of the aspects of the system components (e.g., arbitration component) and illustrate one grouping of operations and responsibilities of these system components. Other groupings that execute similar overall operations are understood to be within the scope of the present application. Modules can be implemented in hardware or as computer instructions on a non-transient computer-readable storage medium, and modules can be distributed across various hardware- or computer-based components.

The systems described above can provide multiple ones of any or each of those components and these components can be provided on either a standalone system or on multiple instantiation in a distributed system. In addition, the systems and methods described above can be provided as one or more computer-readable programs or executable instructions embodied on or in one or more articles of manufacture. The article of manufacture can be cloud storage, a hard disk, a CD-ROM, a flash memory card, a PROM, a RAM, a ROM, or a magnetic tape. In general, the computer-readable programs can be implemented in any programming language, such as LISP, PERL, C, C++, C#, PROLOG, or in any byte code language such as JAVA. The software programs or executable instructions can be stored on or in one or more articles of manufacture as object code.

Example and non-limiting module implementation elements include sensors providing any value determined herein, sensors providing any value that is a precursor to a value determined herein, datalink or network hardware including communication chips, oscillating crystals, communication links, cables, twisted pair wiring, coaxial wiring, shielded wiring, transmitters, receivers, or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), or digital control elements.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices include cloud storage). The operations described in this specification can be implemented as operations performed by a data processing apparatus on data stored on one or more computer-readable storage devices or received from other sources.

The terms "computing device", "component" or "data processing apparatus" or the like encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data can include non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

The systems and methods described herein may be embodied in other specific forms without departing from the characteristics thereof. Scope of the systems and methods described herein is thus indicated by the appended claims, rather than the foregoing description, and changes that come within the meaning and range of equivalency of the claims are embraced therein.

While this specification contains many specific implementation details, these should not be construed as limitations on the scope of any inventions or of what can be claimed, but rather as descriptions of features specific to particular embodiments of particular aspects. Certain features described in this specification in the context of separate embodiments can also be implemented in combination in a single embodiment. Conversely, various features described in the context of a single embodiment can also be implemented in multiple embodiments separately or in any suitable sub combination. Moreover, although features can be described above as acting in certain combinations and even initially claimed as such, one or more features from a claimed combination can in some cases be excised from the combination, and the claimed combination can be directed to a sub combination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the embodiments described above should not be understood as requiring such separation in all embodiments, and it should be understood that the described program components and systems can generally be integrated in a single software product or packaged into multiple software products.

Thus, particular embodiments of the subject matter have been described. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. A system, comprising:
one or more processors coupled with memory, to:
identify voltage waveform data corresponding to electricity distributed over a utility grid and measured by a metering device;
detect, based on a comparison with a threshold established using baseline voltage waveform data, an anomaly in at least a portion of the voltage waveform data;
generate, responsive to detection of the anomaly, spectrogram data for the at least the portion of the voltage waveform data comprising the anomaly;
determine, via a model trained with machine learning, a type of the anomaly based on the spectrogram data generated for the at least the portion of the voltage waveform data comprising the anomaly; and
provide an indication of the type of the anomaly to cause an action to be performed on the utility grid responsive to determination of the type of anomaly.

2. The system of claim 1, comprising:
the one or more processors to determine the type of the anomaly corresponds to at least one of sag, swell, interruption, flicker, oscillatory transient, harmonics, or notch.

3. The system of claim 1, comprising the one or more processors to:
receive the voltage waveform data comprising one or more metrics of the electricity over a first time window and a second time window;
determine the baseline voltage waveform data based on first values of the one or more metrics in the first time window; and
detect the anomaly in the at least the portion of the voltage waveform data in the second time window subsequent to the first time window based on a comparison of second values of the one or more metrics in the second time window with the first values.

4. The system of claim 1, comprising:
a metering system comprising:
the one or more processors coupled with memory; and
the metering device to measure the electricity distributed over the utility grid to generate the voltage waveform data.

5. The system of claim 1, comprising:
a data processing system comprising the one or more processors coupled with the memory, the data processing system remote from the metering device.

6. The system of claim 1, comprising the one or more processors to:
determine a duration of the anomaly based on the at least the portion of the voltage waveform data comprising the anomaly;
determine a magnitude of the anomaly; and
generate a signature identifier for the anomaly based on the type of the anomaly, the duration of the anomaly, and the magnitude of the anomaly.

7. The system of claim 6, comprising:
the one or more processors to select the action to be performed on the utility grid based on the signature identifier.

8. The system of claim 6, comprising:
a data processing system remote from the metering device to:
receive the signature identifier;
correlate a grid event with the signature identifier based on a log of historical grid events and signature identifiers; and
select the action responsive to the correlated grid event.

9. The system of claim 1, comprising the one or more processors to:
identify second voltage waveform data corresponding to the electricity distributed over the utility grid and measured by a second metering device different from the metering device;
determine that a second anomaly in at least a portion of the second voltage waveform data corresponds to the type of the anomaly in the voltage waveform data via classification of second spectrogram data generated for the at least the portion of the second voltage waveform data; and
verify the type of the anomaly originated on the utility grid responsive to the classification of the second anomaly.

10. The system of claim 1, comprising the one or more processors to:
identify second voltage waveform data corresponding to the electricity distributed over the utility grid and measured by a second metering device different from the metering device;
determine that a second anomaly in at least a portion of the second voltage waveform data corresponds to a second type via classification of second spectrogram data generated for the at least the portion of the second voltage waveform data; and
determine, responsive to the type of the anomaly being different from the second type of the second anomaly, a likelihood that a cause of the anomaly is a load at a location of the metering device that measured the voltage waveform data.

11. A method, comprising:
identifying, by one or more processors coupled with memory, voltage waveform data corresponding to electricity distributed over a utility grid and measured by a metering device;
detecting, by the one or more processors, based on a comparison with a threshold established using baseline voltage waveform data, an anomaly in at least a portion of the voltage waveform data;

generating, by the one or more processors, responsive to detection of the anomaly, spectrogram data for the at least the portion of the voltage waveform data comprising the anomaly;

determining, by the one or more processors via a model trained with machine learning, a type of the anomaly based on the spectrogram data generated for the at least the portion of the voltage waveform data comprising the anomaly; and providing, by the one or more processors, an indication of the type of the anomaly to cause an action to be performed on the utility grid responsive to determination of the type of anomaly.

12. The method of claim 11, comprising:

determining, by the one or more processors, the type of the anomaly corresponds to at least one of sag, swell, interruption, flicker, oscillatory transient, harmonics, or notch.

13. The method of claim 11, comprising:

receiving, by the one or more processors, the voltage waveform data comprising one or more metrics of the electricity over a first time window and a second time window;

determining, by the one or more processors, the baseline voltage waveform data based on first values of the one or more metrics in the first time window; and detecting, by the one or more processors, the anomaly in the at least the portion of the voltage waveform data in the second time window subsequent to the first time window based on a comparison of second values of the one or more metrics in the second time window with the first values.

14. The method of claim 11, comprising:

determining, by the one or more processors, a duration of the anomaly based on the at least the portion of the voltage waveform data comprising the anomaly;

determining, by the one or more processors, a magnitude of the anomaly; and generating, by the one or more processors, a signature identifier for the anomaly based on the type of the anomaly, the duration of the anomaly, and the magnitude of the anomaly.

15. The method of claim 14, comprising:

selecting, by the one or more processors, the action to be performed on the utility grid based on the signature identifier.

16. The method of claim 14, comprising:

receiving, by a data processing system remote from the metering device, the signature identifier;

correlating, by the data processing system, a grid event with the signature identifier based on a log of historical grid events and signature identifiers; and selecting, by the data processing system, the action responsive to the correlated grid event.

17. The method of claim 11, comprising:

identifying, by the one or more processors, second voltage waveform data corresponding to the electricity distributed over the utility grid and measured by a second metering device different from the metering device;

determining, by the one or more processors, that a second anomaly in at least a portion of the second voltage waveform data corresponds to the type of the anomaly in the voltage waveform data via classification of second spectrogram data generated for the at least the portion of the second voltage waveform data; and verifying, by the one or more processors, the type of the anomaly originated on the utility grid responsive to the classification of the second anomaly.

18. The method of claim 11, comprising:

identifying, by the one or more processors, second voltage waveform data corresponding to the electricity distributed over the utility grid and measured by a second metering device different from the metering device;

determining, by the one or more processors, that a second anomaly in at least a portion of the second voltage waveform data corresponds to a second type via classification of second spectrogram data generated for the at least the portion of the second voltage waveform data; and determining, by the one or more processors, responsive to the type of the anomaly being different from the second type of the second anomaly, a likelihood that a cause of the anomaly is a load at a location of the metering device that measured the voltage waveform data.

19. A non-transitory computer readable storage medium storing processor executable instructions that, when executed by one or more processors, cause the one or more processors to:

identify voltage waveform data corresponding to electricity distributed over a utility grid and measured by a metering device;

detect, based on a comparison with a threshold established using baseline voltage waveform data, an anomaly in at least a portion of the voltage waveform data;

generate, responsive to detection of the anomaly, spectrogram data for the at least the portion of the voltage waveform data comprising the anomaly;

determine, via a model trained with machine learning, a type of the anomaly based on the spectrogram data generated for the at least the portion of the voltage waveform data comprising the anomaly; and provide an indication of the type of the anomaly to cause an action to be performed on the utility grid responsive to determination of the type of anomaly.

20. The non-transitory computer readable storage medium of claim 19, wherein the instructions further comprise instructions to:

determine the type of the anomaly corresponds to at least one of sag, swell, interruption, flicker, oscillatory transient, harmonics, or notch.

* * * * *